US010270595B2

(12) United States Patent
Schliwa-Bertling et al.

(10) Patent No.: US 10,270,595 B2
(45) Date of Patent: Apr. 23, 2019

(54) METHODS, NODES AND COMMUNICATION DEVICE FOR ESTABLISHING A KEY RELATED TO AT LEAST TWO NETWORK INSTANCES

(71) Applicant: Telefonaktiebolaget LM Ericsson (publ), Stockholm (SE)

(72) Inventors: Paul Schliwa-Bertling, Ljungsbro (SE); Karl Norrman, Stockholm (SE); Alexander Pantus, Solna (SE); Jari Vikberg, Järna (SE); Oscar Zee, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 312 days.

(21) Appl. No.: 14/917,546

(22) PCT Filed: Jan. 14, 2016

(86) PCT No.: PCT/EP2016/050650
§ 371 (c)(1),
(2) Date: Mar. 8, 2016

(87) PCT Pub. No.: WO2017/121482
PCT Pub. Date: Jul. 20, 2017

(65) Prior Publication Data
US 2018/0048465 A1 Feb. 15, 2018

(51) Int. Cl.
*H04L 9/06* (2006.01)
*H04L 9/08* (2006.01)
(Continued)

(52) U.S. Cl.
CPC ......... *H04L 9/088* (2013.01); *G11B 20/0021* (2013.01); *G11B 20/00695* (2013.01);
(Continued)

(58) Field of Classification Search
CPC ....... H04L 9/088; H04L 9/0894; H04W 12/04
See application file for complete search history.

(56) References Cited

U.S. PATENT DOCUMENTS

| 5,953,420 A * | 9/1999 | Matyas, Jr. | H04L 9/0844 380/285 |
| 2011/0158165 A1* | 6/2011 | Dwyer | H04W 60/00 370/328 |
| 2011/0314287 A1* | 12/2011 | Escott | H04L 63/061 713/171 |

FOREIGN PATENT DOCUMENTS

WO WO 01/93002 A2 12/2001

OTHER PUBLICATIONS

International Search Report, Application No. PCT/EP2016/050650, dated Sep. 28, 2016.
(Continued)

*Primary Examiner* — Farid Homayounmehr
*Assistant Examiner* — Suman Debnath
(74) *Attorney, Agent, or Firm* — Sage Patent Group

(57) ABSTRACT

A method of establishing a key related to at least two network instances is disclosed performed in a network node. The network instances are used in serving a communication device. The method comprises obtaining a first key relating to at least a first network instance; obtaining a second key relating to an additional network instance; determining, based on the first key and the second key, a joint key for use in protecting communication with the communication device on the at least first network instance and on the additional network instance. A method in a communication device, network node, communication device, computer programs and computer program products are also disclosed.

39 Claims, 10 Drawing Sheets

(51) Int. Cl.
*G11B 20/00* (2006.01)
*H04W 12/04* (2009.01)

(52) U.S. Cl.
CPC .......... *H04L 9/0662* (2013.01); *H04W 12/04* (2013.01); *H04L 9/0894* (2013.01)

(56) References Cited

OTHER PUBLICATIONS

Cisco, "Clarifications for network slicing examples", Agenda Item: 3.4, 3GPP TSG-SA WG1 Meeting #71bis, S1-153135, Vancouver, Canada, Oct. 19-21, 2015, 3 pp. (XP051033871).
Hedman, "Description of Network Slicing Concept", NGMN Alliance, NGMN 5G P1, Requirements & Architecture, Work Stream End-to-End Architecture, Jan. 13, 2016, 7 pp. (XP055298735).
Prakash et al., "Authentication and Key Agreement in 3GPP Networks", Computer Science and Information Technology (CS & IT), Jul. 23, 2015, pp. 143-154 (XP055301788).
ZTE, "Motivation for Core Network Slicing Study in SA2", Document for: Discussions; Agenda Item: 7.1, Work Item/Release: Rel-14, SA WG2 Meeting #110, S2-152420, Dubrovnik, Croatia, Jul. 6-10, 2015, 3 pp. (XP050987490).

\* cited by examiner

METHODS, NODES AND COMMUNICATION DEVICE FOR ESTABLISHING A KEY RELATED TO AT LEAST TWO NETWORK INSTANCES

CROSS REFERENCE TO RELATED APPLICATION

This application is a 35 U.S.C. § 371 national stage application of PCT International Application No. PCT/EP2016/050650, filed on Jan. 14, 2016, the disclosure and content of which is incorporated by reference herein in its entirety.

TECHNICAL FIELD

The technology disclosed herein relates generally to the field of secure communication in communications networks, and in particular to a method, performed in a network node and communication device, of establishing a key related to at least two network instances. The disclosure also relates to corresponding network nodes, communication device, and related computer programs and computer program products.

BACKGROUND

Network slicing is a new concept that applies to both Long Term Evolution (LTE) and future fifth generation (5G) radio access technology (RAT) (denoted NX herein). In network slicing logically separated partitions of a network are created, wherein the partitions address different business purposes. These "network slices" may be logically separated to a degree such as to be regarded and managed as networks of their own. The logical network slices may enable operators to provide networks on an as-a service basis and thereby meet a wide range of expected use cases.

A driving force for introducing network slicing is a desired business expansion. Such business expansion is believed to be achievable by improving a cellular operator's ability to offer connectivity services in various business areas besides the currently provided mobile communication services. Such new connectivity services may have different network characteristics, e.g. in view of performance, security, robustness and complexity.

FIG. 1 illustrates an architecture for a current working assumption which is that there will be one shared Radio Access Network (RAN) infrastructure 1 that will connect to several Evolved Packet Core (EPC) instances 2a, 2b, in particular one EPC instance per network slice (Slice 1, Slice 2). As the EPC functions are being virtualized it is assumed that the operator can instantiate a new Core Network (CN) when a new slice should be supported. A first slice (Slice 1) may for example be a Mobile Broadband slice and a second slice (Slice 2) may for example be a Machine Type Communication network slice.

In such sliced network, with communication devices 3 (in the following exemplified by User Equipment, UE) that are capable of attaching to multiple network slices, issues may arise in view of how to handle the corresponding different connections. One conceivable approach could be to duplicate the control planes and the user planes, one duplicate pair for each network slice that the UE 3 has requested. However, such approach would be costly in terms of bandwidth, in particular over the air interface. Further, the handling related to sending messages on several connections for several network slices may give complicated procedures e.g. for handling synchronization and handovers. Difficulties may also arise in view of authentication.

SUMMARY

An objective of the present teachings is to address and overcome the above mentioned foreseen difficulties, and this object and others are achieved by the methods, network node, communication device, computer programs and computer program products according to the appended independent claims, and by the embodiments according to the dependent claims.

The objective is according to an aspect achieved by a method performed in a network node of establishing a key related to at least two network instances. The network instances are used in serving a communication device. The method comprises obtaining a first key relating to at least a first network instance; obtaining a second key relating to an additional network instance; and determining, based on the first key and the second key, a joint key for use in protecting communication with the communication device on the at least first network instance and on the additional network instance.

The method provides a number of advantages. For instance, in the method a joint key replaces different network slice-specific keys, thereby providing a method of protection of the common AS or NAS (or both) that involves low complexity.

Further, the generation of the joint key (e.g. a joint $K_{eNB}$ key: $K_{eNB\_joint}$) in a network node such as a RAN node is also dependent on the behavior of state transition of the different network slices, and the generation of the joint key ($K_{ASME\_joint}$) in a network node (e.g. an access security management entity (ASME) such as a Mobility Management Entity (MME)) is then also dependent on the order of authentication, IDLE to ACTIVE transition sequence and attach-detach sequence of the network slices. These new dependencies are based on non-deterministic user behavior and/or system settings such as e.g. different independent configurations for different network slices, and the authentication and encryption are therefore rendered much more secure.

The objective is according to an aspect achieved by a computer program for a network node for establishing a key related to at least two network instances provided for a communication device. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by a network node for establishing a key related to at least two network instances, wherein the network instances are used in serving a communication device. The network node is configured to obtain a first key relating to at least a first network instance; obtain a second key relating to an additional network instance; determine, based on the first key and the second key, a joint key for use in protecting communication with the communication device on the at least first network instance and on the additional network instance.

The objective is according to an aspect achieved by a method performed in a communication device of establishing a key related to at least two network instances, wherein the network instances are used in serving communication device. The method comprises obtaining a first key relating to at least a first network instance; obtaining a second key relating to an additional network instance; determining, based on the first key and the second key, a joint key for use in protecting communication with a network node on the at least first network instance and on the additional network instance.

The objective is according to an aspect achieved by a computer program for a communication device for establishing a key related to at least two network instances. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for establishing a key related to at least two network instances, wherein the network instances are used in serving communication device. The communication device is configured to obtain a first key relating to at least a first network instance; obtain a second key relating to an additional network instance; determine, based on the first key and the second key, a joint key for use in protecting communication with a network node on the at least first network instance and on the additional network instance.

Further features and advantages of the present teachings will become clear upon reading the following description and the accompanying drawings.

DETAILED DESCRIPTION

Figure 1:
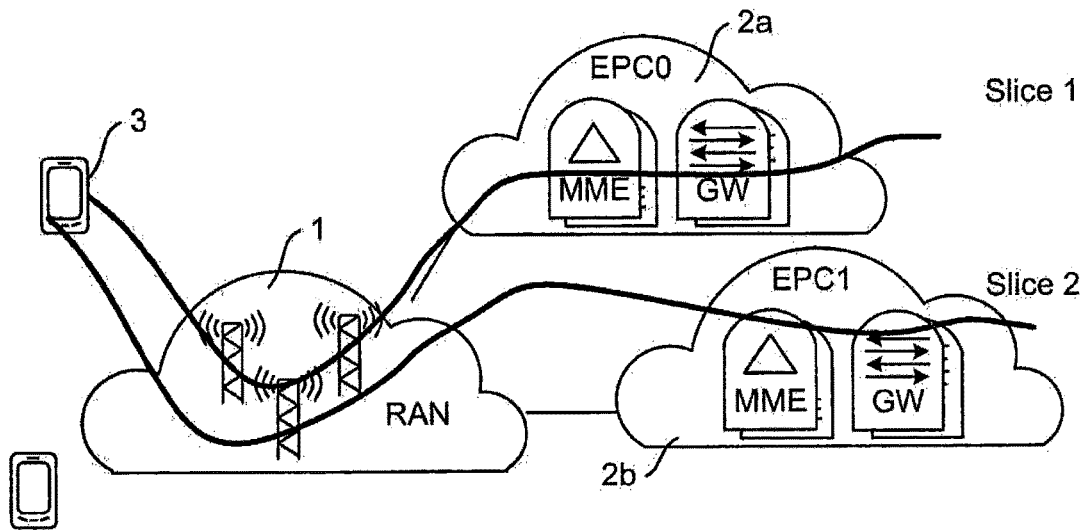
FIG. 1 illustrates a network slicing concept.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

For sake of completeness and to provide a thorough understanding of the present teachings the non-access stratum (NAS) and Access Stratum (AS) are first described briefly. The NAS is a functional layer for example in the Universal Mobile Telecommunications System (UMTS) and LTE wireless telecom protocol stacks between the core network (e.g. Mobility Management Entity, MME, thereof, or Mobile Switching Center (MSC)/Serving General Packet Radio Service Support Node (SGSN)) and a user equipment (UE). This layer is used for managing the establishment of communication sessions and for maintaining continuous communications with the UE as it moves. It is noted that NAS traffic may comprise NAS signaling, but also user plane signaling transmitted from the UE to the MME. The AS is a functional layer in the UMTS and LTE wireless telecom protocol stacks between radio access network (e.g. NodeB, evolved NodeB, eNB, Radio Network controller (RNC) thereof) and the UE. While the definition of the AS is very different between UMTS and LTE, in both cases the AS is responsible for transporting data over the wireless connection and managing radio resources.

In a sliced network with UEs capable of attaching to multiple network slices, it is foreseen that there will be issues with multiple independent keys specific for each respective network slice. The UE and the network side would have to handle one set of keys for each network slice serving the UE. The multiple independent keys and their derivatives are used for the encryption and integrity protection of either shared access stratum (AS) or shared non-access stratum (NAS), or both. The subscription for each network slice for the UE is provisioned independently of any other subscriptions it might have and is stored for example on a Subscriber Identification Module (SIM) or Universal SIM (USIM). The (U)SIM may or may not be stored in a physically separate Universal Integrated Circuit Card (UICC) or temper resistant module. For the purpose of the present teachings it should be understood that calculations of keys and other processing may be performed either in the SIM/USIM/UICC or outside of it in the UE, or both. There may be no coordination between the subscriptions for the network slices and the (U)SIMs are separately distributed for the different network slices. The credentials used for authentication and key establishments may therefore be different per network slice and hence the established keys, e.g. the keys $K_{ASME}$ or $K_{eNB}$, used in LTE/Evolved Packet System (EPS), will be unique for each network slice.

From the above it is realized that the key hierarchy for the respective network slices will be different, and it is not clear which AS keys should be used to protect the AS control plane and user plane for a particular UE over the air interface when they are shared between the slices.

Briefly, the present teachings suggest a solution with a joint key $K_{eNB\_joint}$ (or $K_{ASME\_joint}$ in an embodiment) which is consecutively used for deriving keys used for protection of shared AS. This joint key $K_{eNB\_joint}$ is generated in the eNB and in the UE. The joint key $K_{eNB\_joint}$ can be generated (or regenerated) each time a slice in the UE goes from IDLE to ACTIVE mode. On IDLE to ACTIVE transitions, the MME may provide the eNB with new keying material ($K_{eNB\_i}$) in the S1AP UE INITIAL CONTEXT SETUP message as is also currently done. The eNB may derive a new joint key $K_{eNB\_joint}$ from at least a possibly existing joint key $K_{eNB\_joint}$ and the new keying material ($K_{eNB\_i}$) received from the MME. This newly derived joint key $K_{eNB\_joint}$ is used by the UE and the eNB to derive the actual keys used for protection of the AS instead of having to use different slice-specific keys $K_{eNB\_Slice\ 1}$, $K_{eNB\_Slice\ 2}$, ..., $K_{eNB\_slice\ N}$. The newly derived joint key $K_{eNB\_joint}$ is hence used to protect the AS communication between the eNB and the UE.

In another embodiment, a joint key $K_{ASME\_joint}$ is generated in the MME and in the UE, and this joint key $K_{eNB\_joint}$ is consecutively used for deriving keys used for protection of a shared NAS communication (shared between the different network slices). The joint $K_{ASME\_joint}$ can be generated (or regenerated) each time the UE authenticates to a network slice. The joint $K_{eNB\_joint}$ is used by the MME and the UE to derive the actual keys used for protecting the NAS instead of using multiple slice-specific keys $K_{ASME\_Slice\ 1}$, $K_{ASME\_Slice\ 2}$. The joint $K_{ASME}$ can also be used by the MME and UE to derive keys $K_{eNB}$s for the protection of AS communication.

Figure 2:
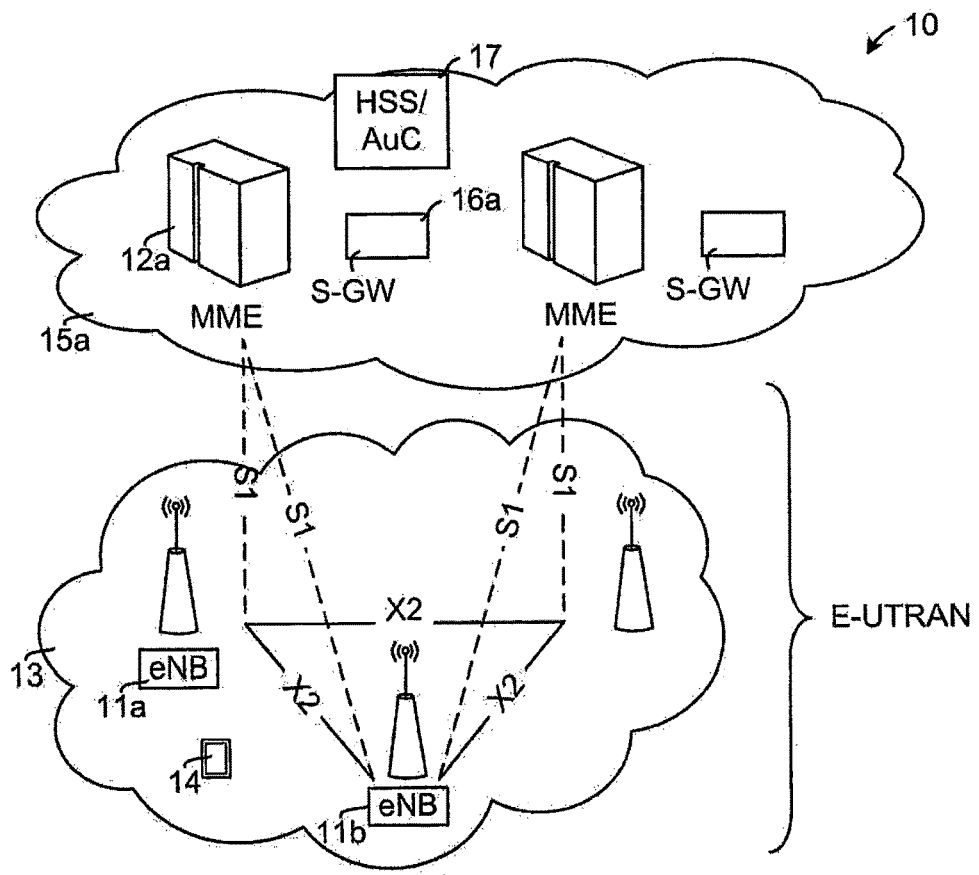
FIG. 2 illustrates an environment, in particular an LTE architecture, in which embodiments according to the present teachings may be implemented.

FIG. 2 illustrates the architecture of a communications system 10, in particular a LTE system. Embodiments according to the present teachings may be implemented in the communication system 10. It is noted that although LTE is used herein as an exemplary implementation, the teachings are applicable also to other systems and protocols than the specifically mentioned system and protocols. The communications system 10 comprises a radio access network (RAN) 13 comprising radio access nodes 11a, 11b (denoted evolved NodeBs, eNBs) communicating over an air interface with communication devices such as the UEs 14. The communications system 10 also comprises an evolved packet core (EPC) network 15a comprising EPC nodes such as Mobility Management Entity (MME) 12a and Serving Gateway (S-GW) 16a. The interface connecting eNBs 11a to the MME/S-GW 12a, 16a is denoted S1, while the interface interconnecting peer eNBs 11a, is denoted X2. The air interface of the RAN 13 is denoted Evolved Universal Terrestrial Radio Access (EUTRA(N)). The third generation partnership project (3GPP) is currently working on standardization of Release 13 of the Long Term Evolution (LTE) concept. The communication system 10 may also comprise a Home Subscriber Server (HSS)/Authentication Centre 17 comprising a database containing subscription related information. The HSS/AuC 17 may, for instance, provide keys needed for authentication and authorization of the communication device 14.

It is noted that although UE 14 is used as an example on a communication device, the network slices may be provided to other types of devices, e.g. machine type devices such as sensors, and for various applications. The communication device may be a wireless device, and it is noted that the communication device may be a virtual device running on a hardware platform. A network slice can thus be tailored for the needs of a specific use case, e.g. in view of speed, capacity, coverage, latency etc. The network slice may comprise virtualized network elements and/or physical resources. For instance, a network slice may comprise a virtualized MME (also denoted MME instance) and an eNB.

In the following, an embodiment is described with reference to FIG. 3 wherein a joint key $K_{eNB\_joint}$ for shared AS and separated NAS is created. "shared" refers to different network slices, connectable to a single UE, having the same AS connection, whereas "separated" refers to the different network slices having different NAS connections.

Figure 3:
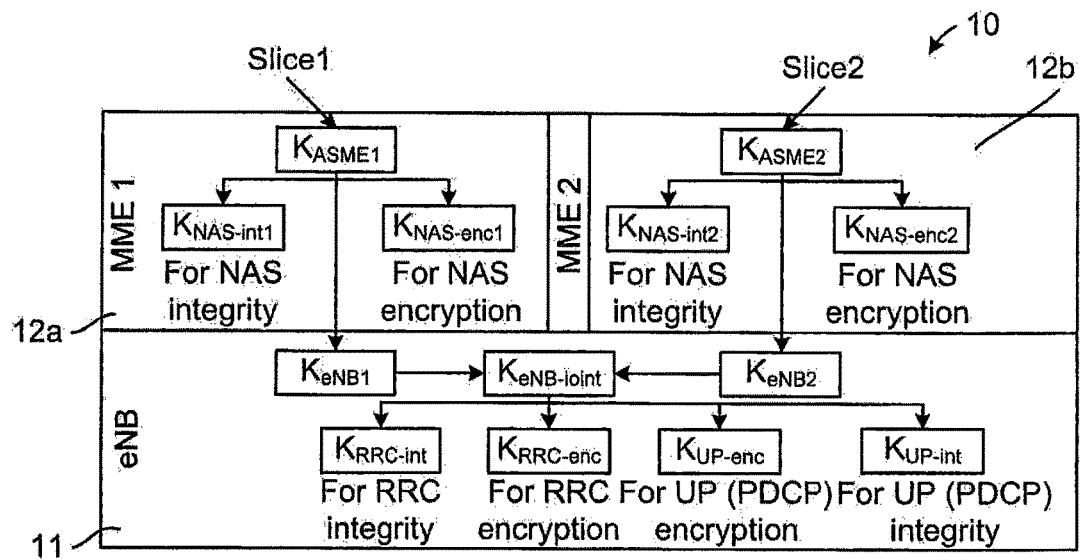
FIG. 3 illustrates a key hierarchy and a scenario of embodiments of an authentication and key agreement procedure and key derivation in accordance with the present teachings.
Figure 3:
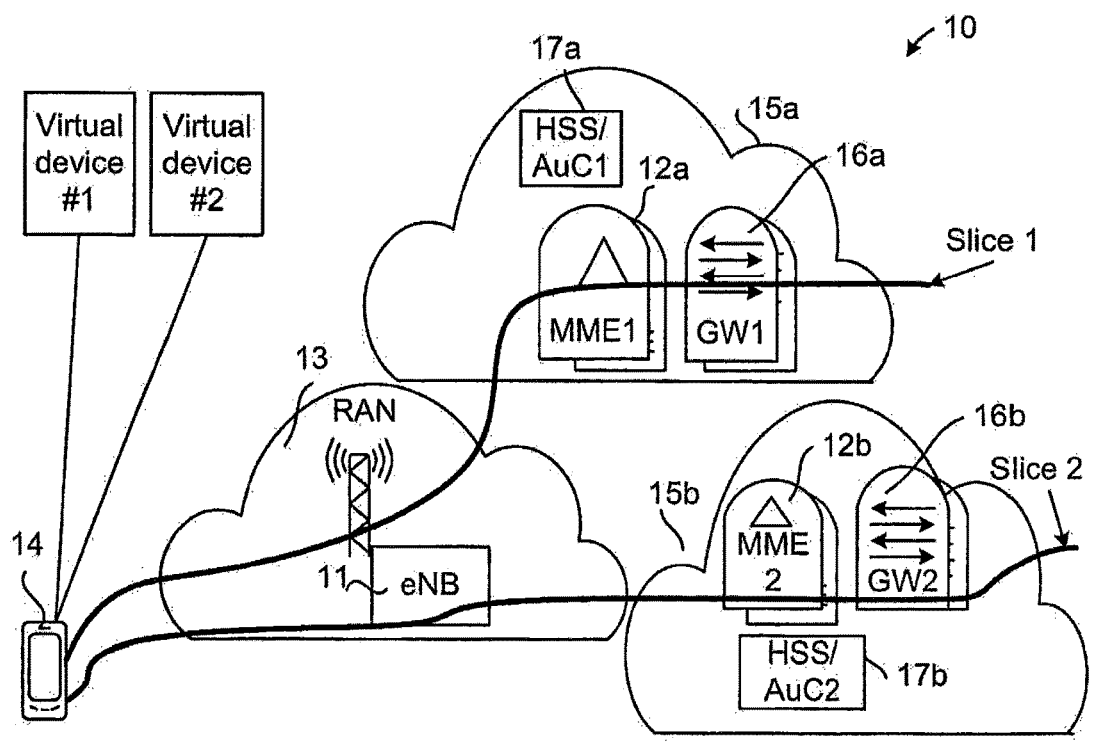

FIG. 3 illustrates a key hierarchy (at uppermost part) and a scenario (at lowermost part) in which embodiments of the present teachings may be implemented.

In this scenario, as illustrated in the lowermost part of FIG. 3, the eNB 11/RAN 13 is shared between the different network slices Slice 1, Slice 2 for the UE 14, i.e. a shared AS connection is used for the different network slices. Each slice has a respective (different) EPC part 15a, 15b, e.g. MME1 (reference numeral 12a) and MME2 (reference numeral 12b), and the UE 14 therefore has separate NAS connections to the different MMEs 12a, 12b. That is, there are separate NAS connections to the respective MME 12a, 12b, one NAS connection for each network slice Slice 1, Slice 2. In this context it is noted that "different MMEs" may be implemented as two virtualized MMEs, also denoted two MME instances, in a single physical device (e.g. server) or the different MMEs may be implemented in two different physical devices. Further, each network slice Slice 1, Slice 2 may also have a respective HSS/AuC: HSS/AuC1 (reference numeral 17a) for a first network slice (Slice 1) and HSS/AuC2 (reference numeral 17b) for a second network slice (Slice 2). Each network slice Slice 1, Slice 2 may also have a respective Serving Gateway (S-GW) 16a, 16b.

A conceivable situation is that different operators share parts of their networks. For example, two operators may use separate core networks, e.g. using their separate HSS, and share the radio access network. It is thus noted that different network slices may belong to different operators and may partially include physically separate nodes or virtual servers controlled by different operators.

The FIG. 3 also shows that the UE 14 may shares its resources, e.g. processing capacity, memory etc., for its various network slices. In particular, a first Virtual device #1 and a second Virtual device #2 are shown as examples, and intended to indicate and exemplify such resource sharing in the UE 14 for the different network slices. As noted earlier, the UE 14 or any other communication device served by the network slices, may be a virtual device running on a hardware platform. Correspondingly, the MME 12a, 12b may also have several instances for creating different network slices for the UEs.

A joint AS key, in the following denoted joint key $K_{eNB\_joint}$, is introduced in this embodiment. The joint key $K_{eNB\_joint}$ is consecutively used for deriving keys used for protection of the shared AS. This joint key $K_{eNB\_joint}$ is generated in the eNB 11 and in the UE 14. The joint key $K_{eNB\_joint}$ can be generated each time the UE 14 goes from IDLE to ACTIVE mode in any network slice. The UE 14 may be ACTIVE on a first network slice Slice 1 and when going from IDLE to ACTIVE in a second network slice Slice 2, the joint key $K_{eNB\_joint}$ is generated and used for all network slices for protection of the shared AS. Once generated at an IDLE to ACTIVE transition, the joint key $K_{eNB\_joint}$ may take on the role of a regular $K_{eNB}$ as used in LTE today. More specifically, after generating the joint key $K_{eNB\_joint}$, the UE 14 and eNB 11 can use the joint key $K_{eNB\_joint}$ in all subsequent procedures and operations in which the $K_{eNB}$ is used today, such as X2-handovers, intra-cell handovers etc. The joint key $K_{eNB\_joint}$ is then used, by the eNB 11 as well as by the UE 14, to derive the actual keys (e.g. $K_{RRC\_enc}$, $K_{RRC\_int}$ and $K_{UP\_enc}$ and optionally also $K_{UP\_int}$) used for protection of the AS. This suggested method is less complex than a method using slice-specific keys $K_{eNB\_Slice\ i}$, i=1, 2, . . . , N, i.e. than a method in which a separate key is used for each respective network slice.

Figure 4:
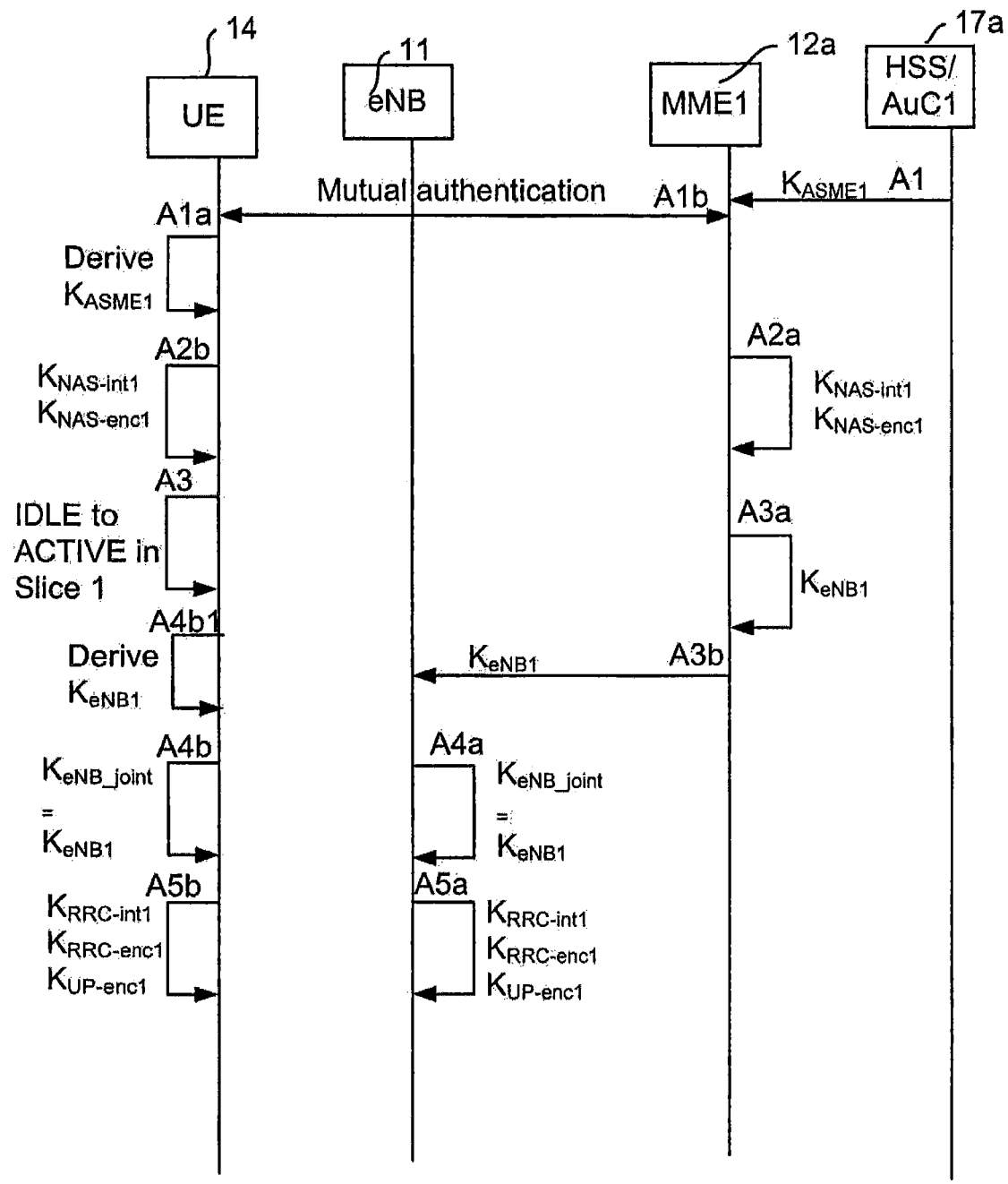
FIG. 4 illustrates a signaling scheme for an authentication and key agreement procedure and key derivation method in accordance with the present teachings.

FIG. 4 illustrates a signaling scheme for an authentication and key agreement procedure and key derivation in a communication system 10 according to the present teachings.

According to an embodiment, the following distributed procedure is executed. The exemplary use case involves two main components: the UE 14 authenticates to two different MMEs (at least a first MME1 and a second MME2) 12a, 12b in different network slices Slice 1, Slice 2, using different credentials for this, and the eNB 11 and the UE 1 maintain a joint key $K_{eNB\_joint}$ when the UE 14 goes from IDLE to ACTIVE mode in the two different network slices Slice 1, Slice 2.

The core network interactions, i.e., between the UE 14 and the different MMEs 12a, 12b (NAS), and also between the eNB 11 and the MMEs 12a, 12b (eNB over S1 interface to MME) can remain unchanged, i.e. remain as current core network interactions. In some embodiments the MMEs 12a, 12b (MME1, MME2) do not even need to be aware of that the key $K_{eNB}$ joining technology according to the present teachings is used between the UE 14 and the eNB 11. However, the UE 14 and eNB 11 need to agree that key $K_{eNB}$ joining shall be used. This may be done by signaling between UE 14 and the MMEs 12a, 12b and between the MMEs 12a, 12b and eNB 11, or by signaling between the UE 14 and the eNB 11. A NAS information element (IE) may be used indicating to the MME 12a, 12b that the UE 14 supports key joining, and also a corresponding S1AP (S1 Application Protocol) IE. In other embodiment it may be known a priori that key joining is used, e.g., wherein it is stipulated in a specification that key $K_{eNB}$ joining shall be used in some conditions such as for example, when network slicing is used. An example on an implementation wherein the MMEs 12a, 12b do not need to be aware that AS key joining is used is to extend existing UE security capability IE in the NAS protocol and in the S1AP protocol. The MME currently forwards this IE "transparently" to the eNB.

With reference now to FIG. 4 the steps performed in the communication system 10 when the UE 14 attaches to a first network slice Slice 1 (e.g. a mobile broadband service) are described.

1. Arrows A1, A1b, A1a: This action may, for instance, be triggered when the UE 14 attaches to a first network slice Slice 1. A first MME 12a is serving this first network slice Slice 1 and obtains an (EPS) authentication vector comprising at least a key $K_{ASME1}$ from a first HSS/AuC1 (arrow A1) serving this first network slice Slice 1. The first MME 12a then uses data from the authentication vector to run a NAS authentication procedure with the UE 14 which results in that the UE 14 and the first MME 12a are mutually authenticated (arrow A1b) based on a key K (associated with e.g. International Mobile Subscriber Identity, IMSI) shared between the UE 14 and the first HSS/AuC1 serving the first network slice Slice 1. As part of the authentication procedure the UE 14 also derives (arrow A1a) the same key $K_{ASME1}$ as the first MME 12a did. This is described as a conventional LTE authentication, but it is noted that other authentication methods resulting in a shared key (here $K_{ASME1}$) between the first MME 12a and the UE 14 are possible.

2. Arrows A2a, A2b: The first MME 12a and the UE 14 independently derive NAS level keys: the keys $K_{NAS-int1}$ and $K_{NAS-enc1}$. These keys $K_{NAS-int1}$ and $K_{NAS-enc1}$ are derived from $K_{ASME1}$ and used for integrity protection and encryption of NAS traffic for the first network slice Slice 1. The first MME 12a serving the first network slice Slice 1 activates NAS security (not illustrated in FIG. 4) for the UE 14 on the first network slice Slice 1. It is noted that "derived from" may be differently stated as "based on"; in essence a key is used to obtain another key.

3. Arrows A3, A3a, A3b: When the UE 14 goes from IDLE to ACTIVE mode (arrow A3) in the first network slice Slice 1, the first MME 12a serving this network slice creates (arrow A3a) a key $K_{eNB1}$ based on the key $K_{ASME1}$ and then sends (arrow A3b) it to the eNB 11 in connection to the RRC setup for the first network slice Slice 1, i.e. when the first MME 12a creates the UE context in the eNB 11.

4. Arrow A4a: If the eNB 11 does not have any defined value for a joint AS key, provided according to the present teachings and named $K_{eNB-joint}$, the eNB 11 sets (arrow A4a) the key $K_{eNB-joint}$ equal to the received $K_{eNB1}$. In this case, since no previous key $K_{eNB-joint}$ exists for the UE 14, the eNB 11 consequently sets the key $K_{eNB-joint}$ equal to the received $K_{eNB1}$. The situation where the $K_{eNB-joint}$ already has a defined value will be described later (e.g. in relation to FIG. 5).

5. Arrows A5a: AS level keys $K_{RRC-int}$ and $K_{RRC-enc}$ are created in the eNB 11 based on the key $K_{eNB-joint}$ and used for integrity protection and encryption of RRC control plane signaling on Packet Data Convergence Protocol (PDCP) level. That is, the keys $K_{RRC-int}$ and $K_{RRC-enc}$ applies to the common RRC connection and user plane (UP) connection (using AS security mode command procedure in case of initial security activation) or RRC reconfiguration procedure for intra-cell handover in order to trigger a "key change on the fly" procedure (described and exemplified later).

Keys $K_{UP-enc}$ (and optionally $K_{UP-int}$) are created (arrow A5a) in the eNB 11 based on the joint key $K_{eNB-joint}$ and are used for encryption (and optionally integrity protection) of PDCP user plane traffic.

6. Arrows A4b1, A4b A5b: The UE 14 thus derives (arrow A4b1) the same AS key $K_{eNB1}$ as the first MME 12a and then, when going from IDLE to ACTIVE mode, the UE 14 derives the same keys $K_{RRC-enc}$, $K_{RRC-int}$, $K_{UP-enc}$ (and optionally $K_{UP-int}$) (arrow A5b) as the eNB 11. The UE also defines the value of its joint AS key $K_{eNB-joint}$ to be equal to $K_{eNB1}$ (arrow A4b).

Figure 5:
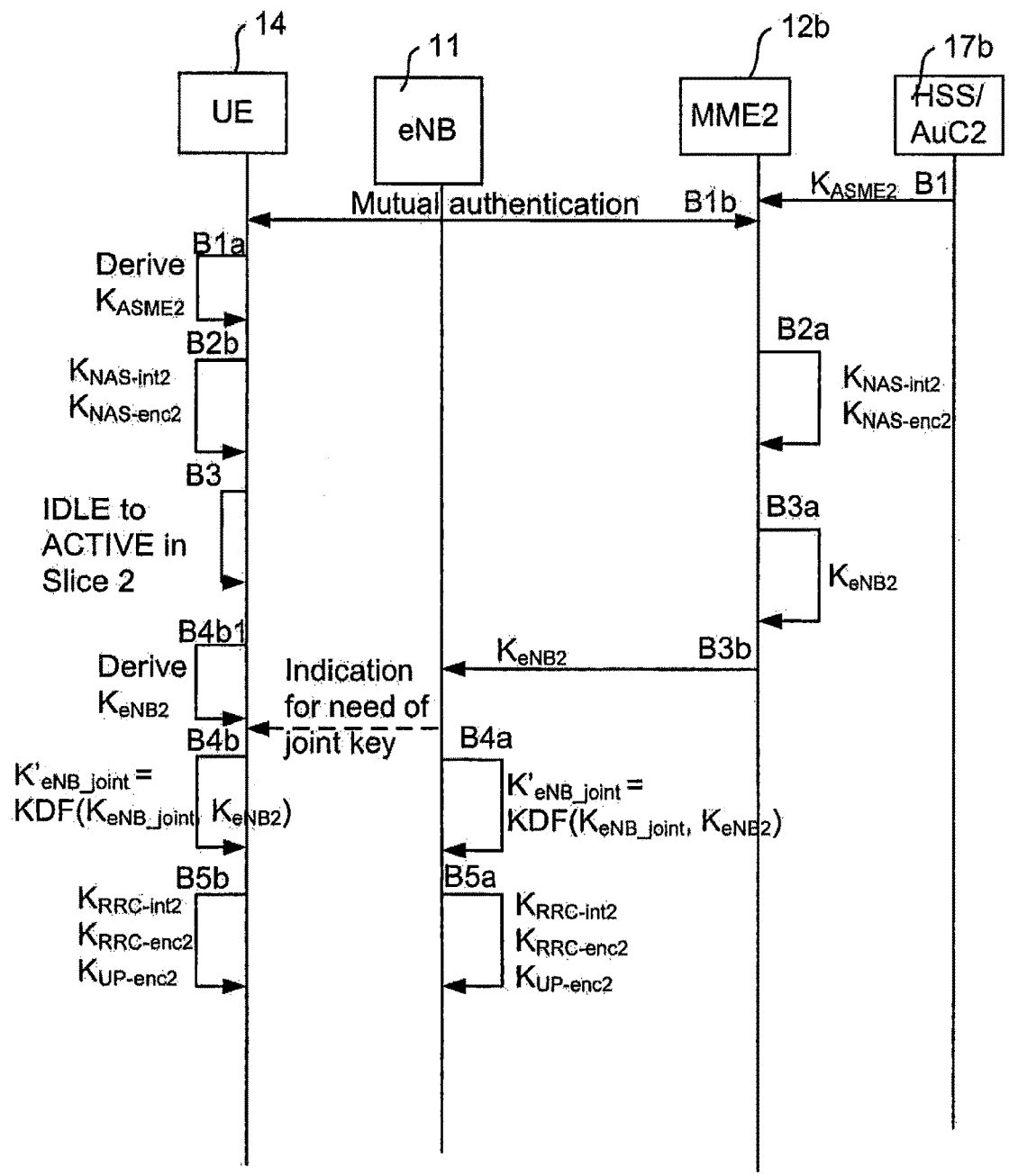
FIG. 5 illustrates a signaling scheme for an authentication and key agreement procedure and key derivation method in accordance with the present teachings.

FIG. 5 is a signaling scheme for the case when the UE 14 wants to set up another service. FIG. 5 may be seen as a continuation of FIG. 4, but involving a second MME2 12b and a second network slice Slice 2. However, the steps of the signaling schemes may be done in another order than illustrated, as will be exemplified later.

7. Next, when the UE 14 wants to set up another service, e.g. Machine Type Communication service, and thus needs to set up a second network slice, Slice 2, steps corresponding to the above are performed. This is described next. The UE 14 hence attaches to a second network slice Slice 2.

8. Arrow B1, B1b, B1a (corresponds to Arrows A1, A1b, A1a) except that it involves the second network slice, which entails another core network): A second MME 12b is serving the second network slice Slice 2 and receives (arrow B1) an authentication vector containing at least a key $K_{ASME2}$ from a second HSS/AuC2 17b serving this second network slice Slice 2. The second MME 12b uses data from the authentication vector to run a NAS authentication procedure with the UE 14 which results in that the UE 14 and second MME 12b are mutually authenticated (arrow B1b) based on the key K shared between the UE 14 and the HSS/AuC2 17b serving the second network slice Slice 2. As part of the authentication procedure the UE 14 also derives (arrow B1a) the same key $K_{ASME2}$ as the second MME 12b did. As noted earlier, also other authentication methods resulting in a shared key are possible, and although preferable, the UE 14 and MME 12b need not obtain mutual authentication.

9. Arrows B2a, B2b (corresponds to Arrows A2a, A2b, except that it involves the second network slice, which entails another core network): The second MME 12b and the UE 14 independently derive (arrows B2a and B2b, respectively) NAS level keys: the keys $K_{NAS-int2}$ and $K_{NAS-enc2}$. These keys $K_{NAS-int2}$ and $K_{NAS-enc2}$ are derived from $K_{ASME2}$ and used for integrity protection and encryption of NAS traffic for the second network slice Slice 2. The second MME 12b serving the second network slice Slice 2 activates NAS security (not illustrated in the FIG. 5) for the UE 14 on the second network slice Slice 2.

It is noted that the above steps described in relation to Arrows B1, B1a, B1b, B2a and B2b and relating to authentication and activation of the NAS security for the second network slice Slice 2 could be performed at any point of time, for instance after the steps of arrows A1, A1a, A1b, A2a, A2b.

10. Arrows B3, B3a, B3b: When the UE 14 goes from IDLE to ACTIVE state (arrow B3) in the second network slice Slice 2, it already is in ACTIVE mode in the first network slice Slice 1 and hence there is an existing AS security context (including the joint key $K_{eNB-joint}$ established earlier in relation to arrow A4a, A4b) shared between the UE 14 and the eNB 11. The second MME 12b serving the second network slice Slice 2 may (and need) not be aware of this existing AS security context. The second MME 12b serving the second network slice Slice 2 derives (arrow B3a) a key $K_{eNB2}$ from the key $K_{ASME2}$ and then sends (arrow B3b) it to the eNB 11 in connection to the RRC setup, i.e. when the second MME 12b creates the UE context in the eNB 11 for the second network slice Slice 2.

11. Arrow B4a: On reception of the key $K_{eNB2}$ from the second MME 12b, the eNB 11 notices that the joint key $K_{eNB-joint}$ is already defined and in use. Therefore the eNB 11 derives (arrow B4a) a new key $K_{eNB-joint}=KDF(K_{eNB-joint}, K_{eNB2})$, wherein KDF stands for Key Derivation Function. As a particular example of a KDF that may be used, Hash-based Message Authentication Code-Secure Hash Algorithm 256 (HMAC-SHA256) as used in LTE can be mentioned. However, it is realized that other pseudo random functions, such as e.g. keyed message authentication codes, stream ciphers may also be used. The eNB 11 need not keep the key $K_{eNB2}$ received from the second MME 12b. According to another embodiment of the present teachings, the eNB 11 derives the joint key $K'_{eNB-joint}$ as $KDF(\{K_{eNB-i}\})$ over the set of all received keys $K_{eNBs}$, wherein each received key $K_{eNBn}$ corresponds to a separate network slice n. This latter embodiment however requires more storage as all keys $K_{eNB-i}$ need to be stored.

12. The eNB 11 runs a "Key change on the fly" procedure with the UE 14 indicating for instance with a flag to the UE that this is a "$K_{eNB}$ joining" type of key change, and sets (arrow B4a) the joint key $K_{eNB-joint}$ equal to $K'_{eNB-joint}$. In FIG. 5, such indication for the need of a joint key is shown as an arrow from the eNB 11 to the UE 14, and it is noted that the indication may be sent at any time. For instance, the "$K_{eNB}$ joining" type of key change may be sent in a System Information Block (SIB) broadcast from the eNB 11, in which the UE 14 is aware of the type of key joining already as a first step of the signaling scheme. Other examples on how to make the UE 14 aware of the key joining have been given earlier and any such method may be used in all embodiments.

13. Arrow B5a: New AS level keys $K_{RRC-int}$ and $K_{RRC-enc}$ are derived (arrow B5a) in the eNB 11 from the key $K'_{eNB-joint}$ for integrity protection and encryption of RRC control plane signaling on PDCP level. These keys apply to the new existing common RRC connection and existing and new UP connection (for the first and second network slices, respectively) using AS security mode command procedure (in case of initial security activation) or RRC reconfiguration procedure for intra-cell handover to trigger "key change on the fly".

Keys $K_{UP-enc2}$ (and optionally $K_{UP-int2}$) are derived (also indicated at arrow B5a) in the eNB 11 from the key $K'_{eNB-joint}$ for encryption (and optionally integrity protection) of PDCP user plane traffic.

14. Arrows B4b1, B4b, B5b: The UE 14 derives (arrow B4b1) the same keys $K_{eNB2}$ as the second MME 12b did (at steps 10 and 11) and then derives (arrow B5b) the same keys $K'_{eNB-joint}$, $K_{RRC-enc2}$, $K_{RRC-int2}$, $K_{UP-enc2}$ (and optionally $K_{UP-int2}$) as the eNB 11 did (at steps 12 and 13). The UE 14 also sets (arrow Bob) $K_{eNB-joint}$ equal to $K'_{eNB-joint}$.

15. If any of the network slices (slice N) now changes the state for the UE 14 from ACTIVE to IDLE, and then back from IDLE to ACTIVE due to user behavior and/or system setting, steps 10 to 15 will be applied again, but now involving the core network of slice N instead of the second network slice Slice 2. As the key generation is now depending on non-deterministic (non-predictable) user behavior/system setting, this will it more difficult for an attacker to predict and keep track of the key.

When the UE 14 changes mode in one network slice, e.g. enters a sleep mode, the current NAS and AS keys are still used after this mode change. That is, no new key derivation is performed (for the remaining network slice(s)) due to the detach procedure of one network slice. Such sleep mode may, for the case of LTE, correspond to the IDLE state or detached state.

Reverting to FIG. 3, at the uppermost part thereof the key architecture for the above described steps is shown. For instance, for the first network slice Slice 1, the first MME 12a receives a NAS key $K_{ASME1}$, based on which the NAS integrity key $K_{NAS-int1}$ is created for NAS integrity and the NAS encryption key $K_{NAS-enc1}$ is created for NAS encryption. The corresponding is shown for the second network slice Slice 2 and second MME 12b. Also based on the key $K_{ASME1}$ the first MME 12a creates a first AS key $K_{eNB1}$ and sends it to the eNB 11. Correspondingly, the second MME 12b creates a second AS key $K_{eNB2}$ and sends it to the eNB 11. In the eNB 11 a joint key $K_{eNB\_joint}$ is created. If joint key for the UE 14 has no value yet, then the eNB 11 sets the joint key $K_{eNB\_joint}$ equal to the key $K_{eNB1}$. If there already exists a value of the joint key for the UE 14, then the eNB 11 sets the joint key $K_{eNB\_joint}$ equal to, for instance, a function of the existing joint key and a key $K_{eNBn}$ corresponding to additional network slice Slice N.

Figure 6:
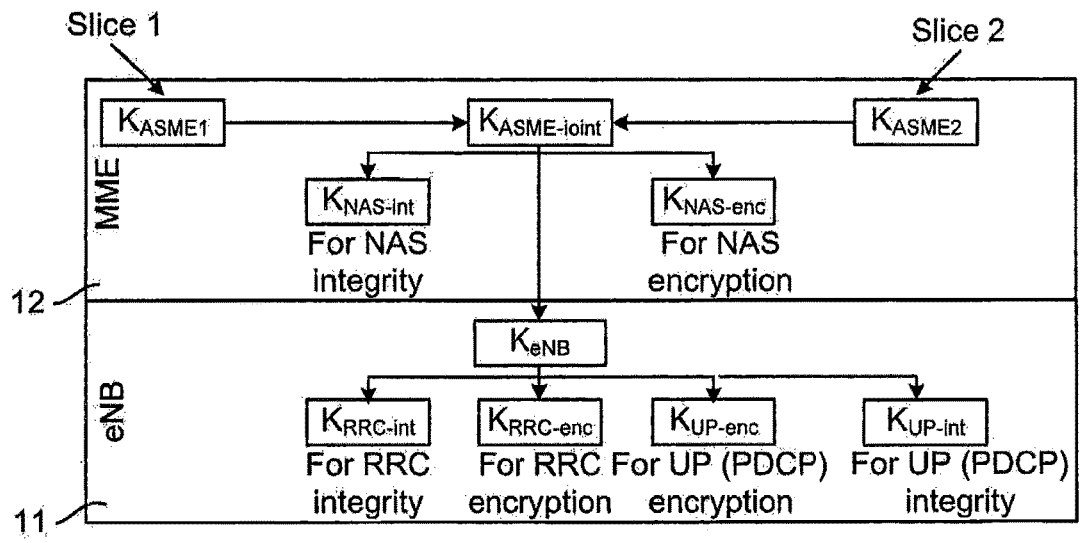
FIG. 6 illustrates a key hierarchy and a scenario of embodiments of an authentication and key agreement procedure and key derivation in accordance with the present teachings.
Figure 6:
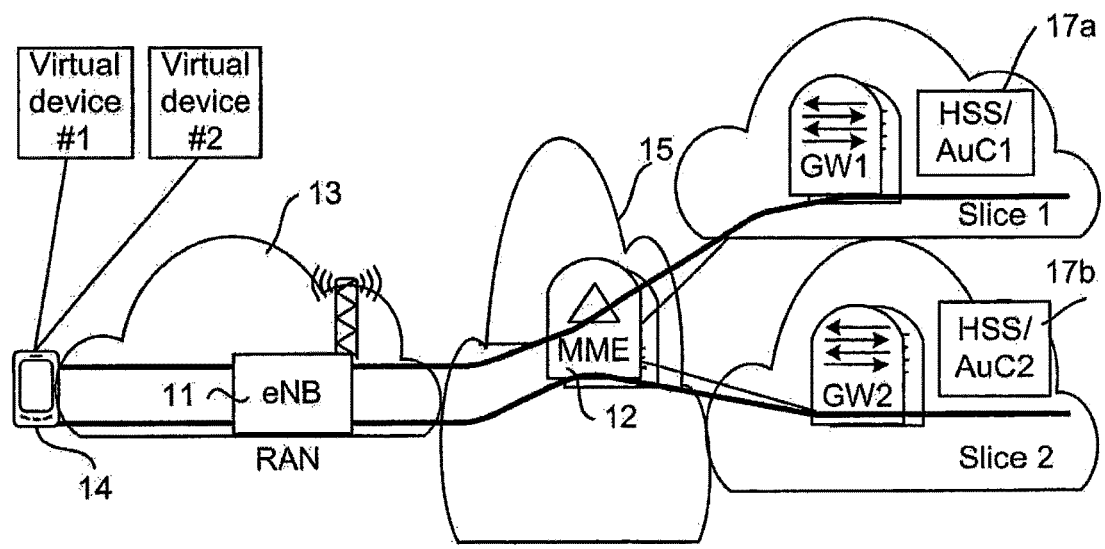

FIG. 6 illustrates a key hierarchy (uppermost part) and a scenario (bottommost part) of another embodiment of an authentication and key agreement procedure and key derivation in a communication system 10.

In this embodiment a joint NAS key, in the following denoted joint key $K_{ASME\_joint}$, for shared AS and shared NAS is created. Both the eNB 11/RAN 13 and the EPC 15 part where the NAS signaling is terminated (e.g. the MME 12 as illustrated in the figure) are shared between the different network slices (Slice 1, Slice 2) for the UE 14, as is illustrated in the lowermost part of FIG. 6. This means that both a shared AS connection and a shared NAS connection are used for the different network slices. The rest of the EPC may be specific for each network slice, as indicated by the network slices Slice 1, Slice 2 having different gateways (GW1, GW2) for connection to the respective service provided by the network slices. Briefly, the joint key $K_{ASME\_joint}$ is consecutively used for deriving keys used for protection of the shared NAS. This joint key $K_{ASME\_joint}$ may be generated in the shared MME 12 (and in the UE 14) during the authentication procedure. It is noted that authentication may be performed at attachment or later as decided by an MME configuration. The joint key $K_{eNB\_joint}$ can be re-generated each time the UE 14 authenticates to a new network slice. The joint key $K_{ASME\_joint}$ is used by the shared MME 12 (and the UE 14) to derive the actual keys used for protection of the shared NAS instead of a set of respective slice-specific keys $K_{asme}$, as well as the keys $K_{eNBs}$ for the RAN.

As for the scenario of FIG. 3, each network slice Slice 1, Slice 2 may also in the present scenario have a respective HSS/AuC: HSS/AuC1 (reference numeral 17a) for the first network slice (Slice 1) and HSS/AuC2 (reference numeral 17b) for the second network slice (Slice 2).

Figure 7:
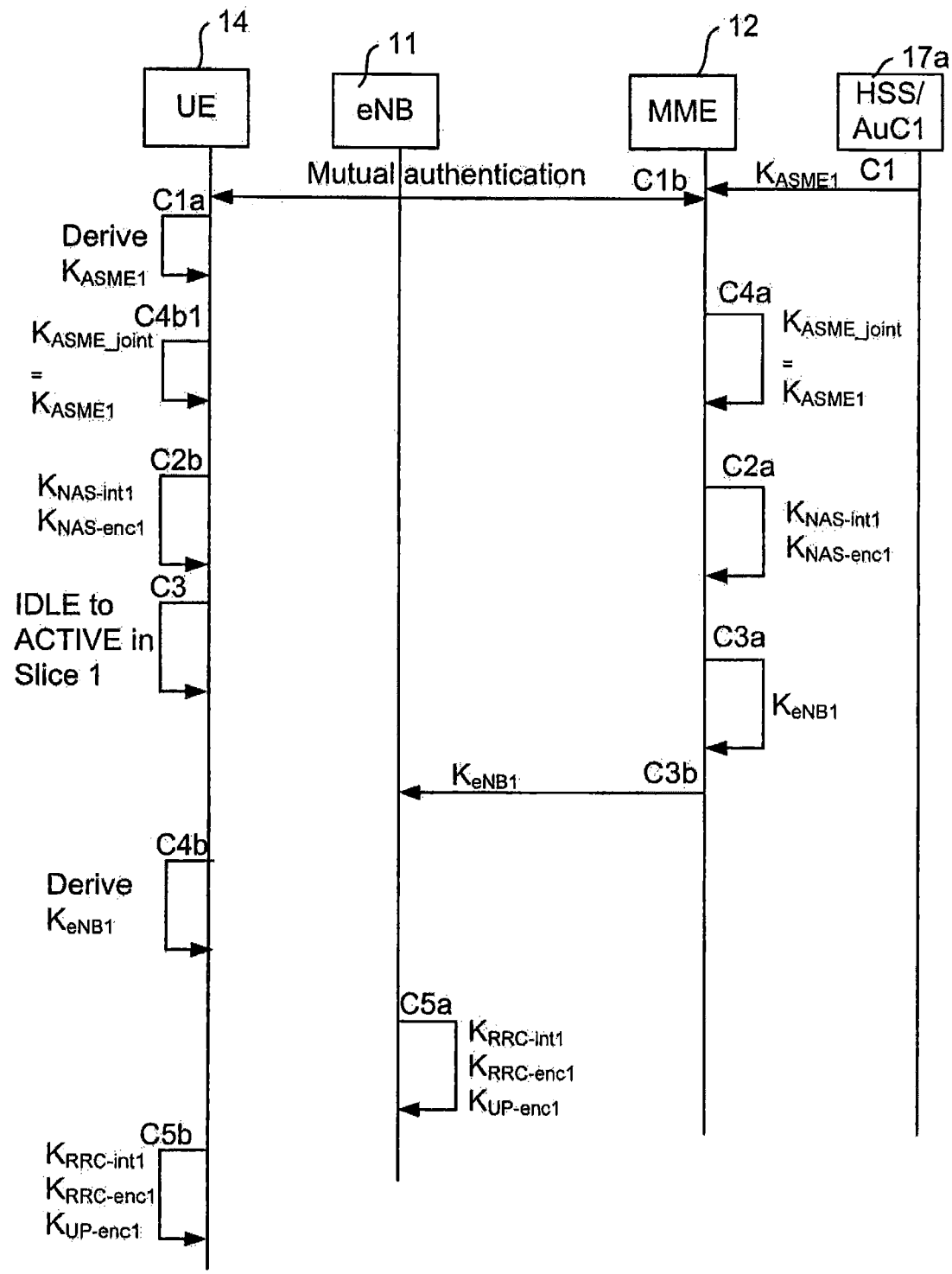
FIG. 7 illustrates a signaling scheme for an authentication and key agreement procedure and key derivation in a communication system according to an embodiment.

FIG. 7 illustrates a signaling scheme for an authentication and key agreement procedure and key derivation in a communication system 10 according to an embodiment of the present teachings.

With reference now to FIG. 7 the steps performed in the communication system 10 when the UE 14 attaches to a first network slice Slice 1 (e.g. a mobile broadband service) are described.

101. Arrows C1, C1b, C1a, C4a, C4b1: The MME 12 serving a first network slice Slice 1 obtains (arrow C1) an authentication vector containing at least the key $K_{ASME1}$ from the HSS/AuC1 17a serving the first network slice Slice 1. Although all network slices share the same MME, the HSS/AuC1 17a for the first network slice need not be the same as the HSS/AuC2 17b as for additional network slices. The MME 12 then uses data from the authentication vector to run a NAS authentication procedure with the UE 14 which results in that the UE 14 and MME 12 are mutually authenticated (arrow C1b) based on the key K shared between the UE 14 and the AuC/HSS1 17a serving the first network slice Slice 1. In addition, the UE 14 derives (arrow C1a) the same key $K_{ASME1}$ as the MME 12 as part of the authentication procedure. As noted earlier for the previous embodiment, this corresponds to a conventional LTE authentication, but other authentication methods resulting in a shared key $K_{ASME1}$ are possible. Thus far this step is the same as step 1 of the previous embodiment. However, in this embodiment the MME 12 further notices that the UE 14 does not have a joint key $K_{ASME\text{-}joint}$ established (i.e. is not connected to another network slice), and hence the MME 12 sets (arrow C4a) the key $K_{ASME\text{-}joint}$ equal to $K_{ASME1}$. This is in contrast to the embodiments described with reference to FIG. 3, wherein a corresponding task was performed by the eNB 11. Also, the UE 14 derives (arrow C4b1) the joint key $K_{ASME\text{-}joint}$.

102. Arrows C2a, C2b: The MME 12 and the UE 14 independently derive (arrows C2a and C2b, respectively) the keys $K_{NAS\text{-}int1}$ and $K_{NAS\text{-}enc1}$ from the joint key $K_{ASME\text{-}joint}$ and use them for integrity protection and encryption of NAS traffic for the first network slice Slice 1. The MME 12 serving the first network slice Slice 1 activates NAS security (not illustrated in FIG. 7) for the UE 14 on all network slices (although only the first network slice Slice 1 is currently active). This step is the same as step 2 of the embodiments described with reference to FIG. 3 except that the joint key $K_{ASME\text{-}joint}$ is used as basis for the key derivations instead of the key $K_{ASME1}$.

103. Arrows C3, C3a, C3b: When the UE 14 goes from IDLE to ACTIVE mode (arrow C3) in the first network slice Slice 1, the MME 12 derives (arrow C3a) the key $K_{eNB1}$ from the joint key $K_{ASME\text{-}joint}$ and then sends (arrow C3b) it to the eNB 11 in connection to the RRC setup for the first network slice Slice 1, i.e. when the MME 12 creates the UE context in the eNB 11. This step 103 is the same as step 3 of the embodiment described with reference to FIG. 3 except that the joint key $K_{ASME\text{-}joint}$ is used as basis for the key derivations instead of the key $K_{ASME1}$.

104. Arrows C5a: Keys $K_{RRC\text{-}int1}$ and $K_{RRC\text{-}enc1}$ are derived (arrow C5a) in the eNB 11 based on the received key $K_{eNB1}$ for integrity protection and encryption of RRC control plane signaling on PDCP level. These AS level keys apply to the common RRC connection and UP connection (using AS security mode command procedure in case of initial security activation) or RRC reconfiguration procedure for intra-cell handover to trigger "key change on the fly".

Keys $K_{UP\text{-}enc}$ (and optionally $K_{UP\text{-}int}$) are derived (also shown at arrow C5a) in the eNB 11 from the received key $K_{eNB1}$ for encryption (and optionally integrity protection) of PDCP user plane traffic.

105. Arrows C4b, C5b: The UE 14 derives (arrow C4b) the same key $K_{eNB1}$ as the MME 12 did in step 103 and then derives (C5b) the same keys $K_{RRC\text{-}enc1}$, $K_{REC\text{-}int1}$, $K_{UP\text{-}enc1}$ (and optionally $K_{UP\text{-}int1}$) as the eNB 11 did in step 104.

Figure 8:
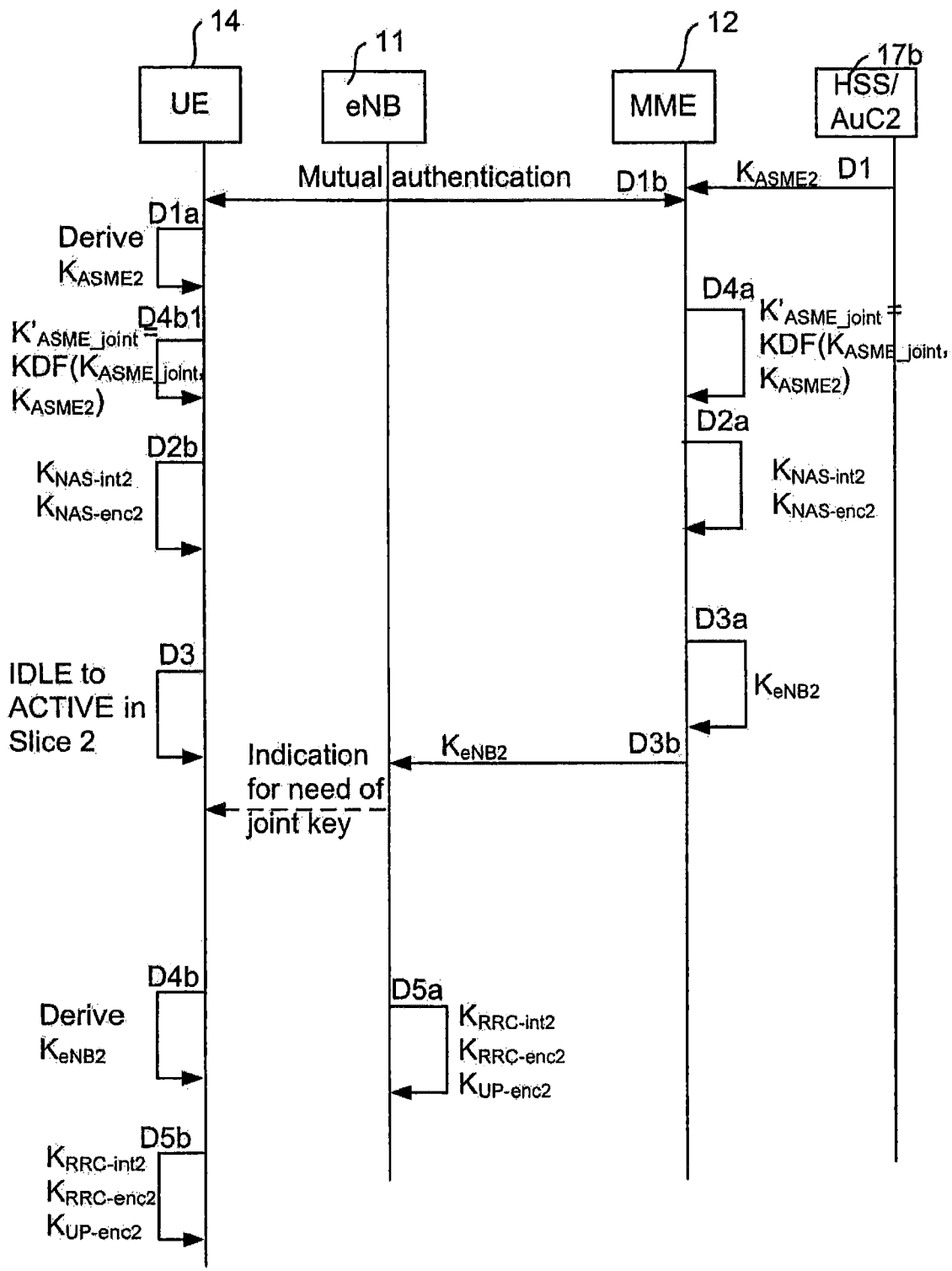
FIG. 8 illustrates a signaling scheme for an authentication and key agreement procedure and key derivation in a communication system according to an embodiment.

FIG. 8 is a signaling scheme for the case when the UE 14 wants to set up yet another service. FIG. 8 may be seen as a continuation of FIG. 7. However, the steps of the signaling schemes may be done in another order than illustrated, as will be exemplified later.

106. Next, when the UE 14 wants to set up another service, e.g. Machine Type Communication service, and therefore needs to set up a connection to a second network slice, Slice 2, steps corresponding to the above are performed. This is described next.

107. Arrows D1, D1b, D1a: This step corresponds to step 101. The MME 12 serving a first network slice Slice 1 is also serving the second network slice Slice 2. The MME 12 obtains (arrow D1) an authentication vector containing at least the key $K_{ASME2}$ from the second HSS/AuC2 17b serving the second network slice Slice 2. The MME 12 then uses data from the authentication vector to run a NAS authentication procedure with the UE 14 which procedure results in that the UE 14 and MME 12 are mutually authenticated (arrow D1b) based on the key K shared between the UE 14 and the second HSS/AuC2 17b serving the second network slice Slice 2. In addition, the UE 14 derives (arrow D1a) the same key $K_{ASME2}$ as the MME 12 as part of the authentication procedure. This step is the same as step 8 of the embodiments described with reference to FIGS. 3, 4 and 5.

108. Arrow D4a: The MME 12 notices that there already is a joint key $K_{ASME\text{-}joint}$ active with this UE 14, and the MME 12 therefore derives (arrow D4a) a new key $K'_{ASME\text{-}joint} = KDF(K_{ASME\text{-}joint}, K_{ASME2})$. In another embodiment, the MME 12 derives the joint key $K'_{ASME\text{-}joint}$ as KDF({$K_{ASME-i}$}) over the set of all established $K_{ASMEs}$. This latter embodiment however requires more storage.

109. Arrows D4b1, D2a, D2b: The MME 12 runs a NAS security mode command procedure (not illustrated in FIG. 8) with the UE 14 indicating that this is a "key $K_{ASME}$ joining" type of key change. The indication can be implemented as a special flag, a special Key Set Identifier (KSI), or implicit in the sense that the UE 14 knows that when network slicing is activated this action is always performed by the MME 12, so any NAS Security Mode Command received at this particular point in time is a "$K_{ASME}$ joining" operation. The UE 14 also derives (arrow D4b1) the joint key $K'_{ASME\text{-}joint}$. As mentioned before, it is noted that the indication may be sent at any time. For instance, a "$K_{ASME}$ joining" type of key change may be sent in a System Information Block (SIB) broadcast from the eNB 11, in which case the UE 14 is aware of the type of key joining already as a first step of the signaling scheme.

The integrity key $K_{NAS\_int2}$ and the encryption key $K_{NAS\_enc2}$ for integrity protection and encryption of shared NAS are independently derived in the shared MME 12 (arrow D2a) and in the UE 14 (arrow D2b) attaching to the second network slice Slice 2. These keys are derived from the joint key $K'_{ASME\text{-}joint}$.

According to another embodiment the UE 14 determines that a key joining operation has taken place by other implicit means, e.g., that a radio bearer has been established as a result of the UE 14 going to ACTIVE mode in that network slice. In the latter case a NAS security mode command is not necessary. After the UE 14 and the MME 12 has agreed to use the new $K'_{ASME\text{-}joint}$, the MME 12 and the UE 14 set $K_{ASME\text{-}joint} = K'_{ASME\text{-}joint}$. Such agreement may for instance comprise, as mentioned earlier (in relation to FIG. 5), sending an indication for the need of a joint key (as shown by an arrow from the eNB 11 to the UE 14).

The handling of the AS keys in the eNB 11 and in the UE 14 is independent on whether or not a joint key $K_{ASME\text{-}joint}$ is being used in the core network.

110. Arrows D3, D3a, D3b: When the UE 14 goes from IDLE to ACTIVE in the second network slice Slice 2 (arrow D3), it already is in ACTIVE mode in the first network slice Slice 1 and hence there is an existing NAS security context, including the joint (NAS) key $K_{ASME\text{-}joint}$ established earlier, shared between the UE 14 and the MME 12.

The MME 12 derives (arrow D3a) a (AS) key $K_{eNB2}$ from the (NAS) key $K_{ASME\_joint}$ and then sends (arrow D3b) the key $K_{eNB2}$ to the eNB 11 in connection to the UE 14 going from IDLE to ACTIVE state in the second network slice Slice 2, i.e. when the MME 12 modifies the UE context in the eNB 11 due to the activation of the second network slice Slice 2 for the UE 14.

111. Arrows D5a: On reception of the key $K_{eNB2}$ from the MME 12, the eNB 11 derives new AS level keys $K_{RRC\text{-}int2}$ and $K_{RRC\text{-}enc2}$ (arrow D5a) from the received key $K_{eNB2}$ for integrity protection and encryption of RRC control plane signaling on PDCP level. These keys apply to the new and existing common RRC connections and to the new and existing UP connections (for the first and second network slices, respectively) using AS security mode command procedure (in case of initial security activation) or RRC reconfiguration procedure for intra-cell handover to trigger "key change on the fly".

Keys $K_{UP\text{-}enc2}$ (and optionally $K_{UP\text{-}int2}$, not illustrated in FIG. 8) are derived (arrow D5a) in the eNB 11 from the received key $K_{eNB2}$ for encryption (and optionally integrity protection) of PDCP user plane traffic.

112. Arrows D4b, D5b: The UE 14 derives (arrow D4b) the same key $K_{eNB2}$ as the MME 12 did and then derives (arrow D5b) the same keys $K_{RRC\text{-}enc2}$, $K_{RRC\text{-}int2}$, $K_{UP\text{-}enc2}$ (and optionally $K_{UP\text{-}int2}$, again not illustrated in FIG. 8) as the eNB 11 did.

Figure 9:
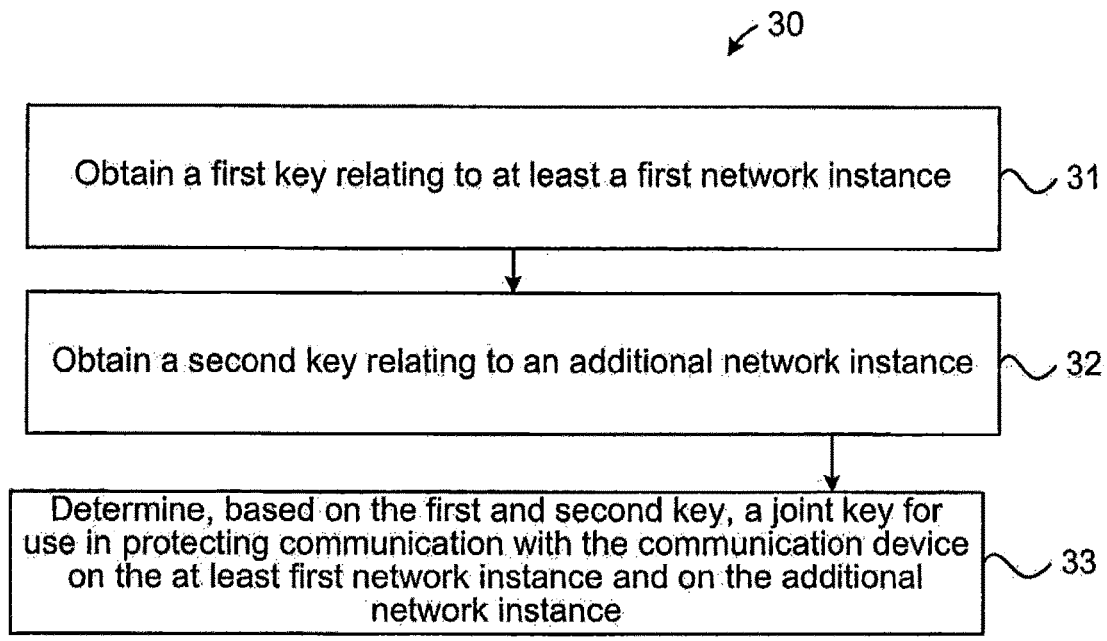
FIG. 9 illustrates a flow chart over steps of an embodiment of a method in a network node in accordance with the present teachings.

If the UE 14 detaches from any of the network slices (slice N) and then attaches to the network slice again due to user behavior, steps 106 to 112 will be applied again FIG. 9 illustrates a flow chart over steps of a method in a network node in accordance with the present teachings.

A method 30 of establishing a key related to at least two network instances Slice 1, Slice 2 is provided and may be performed in a network node 11; 12, such as a radio access node or a core network node such as MME. The network instances Slice 1, Slice 2 are used in serving a communication device 14. It is noted that when the network node 11; 12 and the communication device 14 establish keys for protecting a connection, this may be done by each entity deriving the keys locally from shared secret data, such as a key (e.g. associated with IMSI).

The method 30 comprises obtaining 31 a first key $K_{eNB1}$; $K_{ASME1}$ relating to at least a first network instance Slice 1. Depending on whether the communication device 14 at hand already has network instances set up, there may already be a joint key. If so, the joint key corresponds to the first key, else the first key may correspond to the key $K_{eNB1}$; $K_{ASME1}$ received from the network node of the network instance that is set up for the communication device.

The method 30 comprises obtaining 32 a second key $K_{eNB2}$; $K_{ASME2}$ relating to an additional network instance Slice 2.

In some embodiments, the first and second keys may comprise AS related keys ($K_{eNB1}$, $K_{eNB2}$), while in other embodiments the first and second keys may comprise NAS related keys ($K_{ASME1}$, $K_{ASME2}$).

The method 30 comprises determining 33, based on the first key $K_{eNB1}$; and the second key $K_{eNB2}$; $K_{ASME2}$, a joint key $K_{eNB\_joint}$; $K_{ASME\_joint}$ for use in protecting communication with the communication device 14 on the at least first network instance Slice 1 and on the additional network instance Slice 2. The joint key $K_{eNB\_joint}$; $K_{ASME\_joint}$ may be used for protecting communication on active network instances among the at least first and the additional network instances. If one network instance is detached, the joint key may still be used for protecting communication on remaining active network instances.

The method provides a low-complex authentication solution for use in sliced network scenarios, by the communication device as well as the network side having a joint key for protection of the AS, NAS (or both) that is (are) shared by the different network slices. Thereby there is no need to protect the control plane and user plane with keys that are specific for each respective network slice. The joint key may then be used for encryption and integrity protection of the shared AS, NAS (or both).

Further, the generation of the joint key in a network node such as a RAN node is also dependent on the behavior of state transition of the different network slices, and the generation of the joint key ($K_{ASME\_joint}$) in a network node (e.g. MME) is then also dependent on the order of authentication, IDLE to ACTIVE transition sequence and attach-detach sequence of the network slices.

When the key jointing is implemented in a radio access node, for example an eNB 11, the method 30 may entail a joint AS key $K_{eNB\_joint}$.

When the key jointing is implemented in a core network node, for example an MME 12, the method 30 may a joint NAS key $K_{ASME\_joint}$.

In an embodiment, the determining 33 comprises deriving a first joint key based on the first key $K_{eNB1}$; $K_{ASME1}$ and, upon obtaining the second key, $K_{eNB2}$; $K_{ASME2}$, deriving the joint key $K_{eNB\_joint}$; $K_{ASME\_joint}$ based on the first joint key and the second key $K_{eNB2}$; $K_{ASME2}$. In some embodiments, the deriving the first joint key may comprise an identity mapping. That is, the deriving does not involve any operation other than simply putting the first joint key equal to the first key $K_{eNB1}$; $K_{ASME1}$. For instance, if the communication device 14 is in IDLE mode in all its network slices and then goes to ACTIVE mode in one particular network slice, the communication device 14 and the network node 11; 12 may then use the first key (e.g. the key $K_{eNB}$ or the key $K_{ASME}$) as is without any modifications.

Various ways of deriving the joint key have been given, e.g. in relation to step 11 (FIG. 5) and step 109 (FIG. 8). Any such described way of deriving the joint key may be used.

In various embodiments, the joint key $K_{eNB\_joint}$; $K_{ASME\_joint}$ is used for determining cryptographic keys for protecting communication with the communication device 14 for at least one of the at least two network instances.

In the above embodiments, the determining may comprise deriving, based on the joint key $K_{eNB\_joint}$, the cryptographic keys, wherein the cryptographic keys are used for one or more of: access stratum integrity key $K_{RRC\_int}$ for integrity protection of radio resource control traffic, access stratum encryption key $K_{RRC\_enc}$ for encryption of radio resource control traffic, access stratum encryption key $K_{UP\_enc}$ for encryption of user plane traffic, and access stratum integrity key $K_{UP\_int}$ for integrity protection user plane traffic.

In other embodiments, the determining the cryptographic keys for protecting communication with the communication device 14 for at least one of the at least two network instances comprises deriving, based on the joint key $K_{ASME\_joint}$, the cryptographic keys, wherein the cryptographic keys are used for one or more of: non-access stratum integrity key $K_{NAS\_int}$ for integrity protection of non-access stratum traffic, and non-access stratum encryption key $K_{NAS\_enc}$ for encryption of non-access stratum traffic.

It is noted that the above two embodiments may be combined, so that AS communication as well as NAS communication are protected by use of a respective joint key.

In various embodiments, the network node 11 comprises a network node of a radio access network 13. The network node may for instance comprise an eNB or other network node in which the AS signaling terminates. In such embodiments, the joint key $K_{eNB\_joint}$ may be used for protecting access stratum communication with the communication device 14.

In various embodiments, the network node 12 comprises a network node of a core network 15. The network node may for instance comprise an MME or other network node in which the NAS signaling terminates. In such embodiments, the joint key $K_{ASME\_joint}$ may be used in the protection of non-access stratum communication with the communication device 14. The use of the joint key $K_{ASME\_joint}$ may be seen as an indirect use in that it is used in deriving keys such as the integrity protection key $K_{NAS\_int}$ and the encryption protection key $K_{NAS\_enc}$.

In an embodiment, the method 30 comprises indicating, to the communication device 14, that a joint key $K_{eNB\_joint}$; $K_{ASME\_joint}$ is to be used. As have been described earlier, the communication device 14 can, in different ways, be made aware of that key-jointing is to be used, for instance, by signaling between the communication device 14 and the network node 12. Another way is to have the communication device configured to use key joining when network slicing is used. Various examples on how to implement this indication have been given and may be used.

In an embodiment, the obtaining 31 the first key $K_{eNB1}$; $K_{ASME1}$ relating to at least the first network instance Slice 1 and the obtaining 32 the second key $K_{eNB2}$; $K_{ASME2}$ relating to an additional network instance Slice 2, comprises receiving the first key $K_{eNB1}$; $K_{ASME1}$ and the second key $K_{eNB2}$; $K_{ASME2}$ from a second network node 12; 17. For instance, when the network node implementing the method 30 is a radio access node such as an eNB, the first and second keys may be obtained, in particular received, from a core network node such as the MME. When the network node implementing the method 30 is a core network node such as MME the first and second keys may be obtained, in particular received, from a core network node such as the HSS/AuC.

In an embodiment, the method 30 comprises establishing a mode change of an active network instance, and continuing using the current joint key $K_{eNB\_joint}$; $K_{ASME\_joint}$ in protecting communication with the communication device 14 on the remaining active network instances. The establishing of a mode change of an active network instance may, for instance, comprise the network node detecting that a set timeout value of a timer has elapsed. Such timeout value may indicate the maximum time that the communication device may be inactive in a network instance before the network node considers the communication device to be in IDLE mode. As another example, the establishing of mode change may comprise receiving a detach request message from the communication device.

Figure 10:
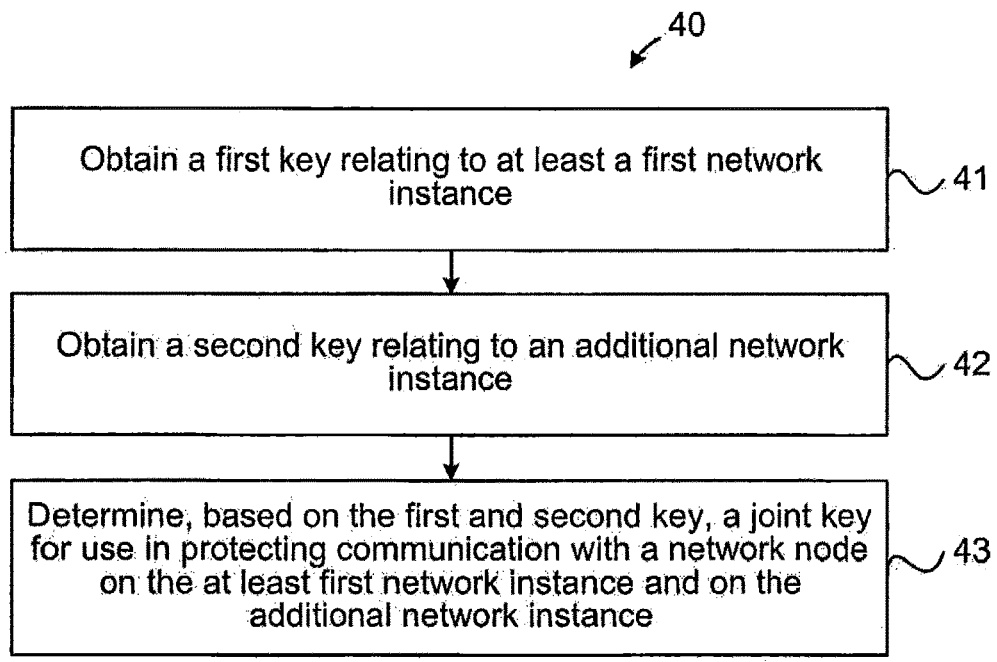
FIG. 10 illustrates a flow chart over steps of an embodiment of a method in a communication device in accordance with the present teachings.

FIG. 10 illustrates a flow chart over steps of a method in a communication device in accordance with the present teachings.

The method 40 of establishing a key related to at least two network instances Slice 1, Slice 2 is performed in a communication device 14. The network instances Slice 1, Slice 2 are used in serving communication device 14. The method 40 comprises obtaining 41 a first key $K_{eNB1}$; $K_{ASME1}$ relating to at least a first network instance Slice 1; obtaining 42 a second key $K_{eNB2}$; $K_{ASME2}$ relating to an additional network instance Slice 2; and determining 43, based on the first key $K_{eNB1}$; $K_{ASME1}$ and the second key $K_{eNB2}$; $K_{ASME2}$, a joint key $K_{eNB\_joint}$; $K_{ASME\_joint}$ for use in protecting communication with a network node 11; 12 on the at least first network instance and on the additional network instance Slice 1, Slice 2.

An advantage of the method 40 is that the communication device 14 is provided with a method of protection of the common AS or NAS (or both) having low complexity, owing to the use of the joint key for different network slices. As a particular example, the scenario of an attacker having compromised the confidentiality of communication link between the eNB 11 and MME 12 is considered. The attacker is not aware of the AS key $K_{eNB}$ sent to the eNB 11 prior to the moment of time that the attacker successfully compromised the confidentiality. In this case the attacker will not be able to reconstitute the key $K_{eNB\_joint}$ derived by eNB 11 when the communication device 14 wants to set up a new network service on an additional network slice. The attacker is not aware of the previous $K_{eNB}$ value and since this previous $K_{eNB}$ value is required to derive the new $K_{eNB\_joint}$ the communication link is again secure (for all network slices) from the attacker.

In an embodiment, the determining 43 comprises deriving a first joint key based on the first key $K_{eNB1}$; $K_{ASME1}$ and, upon obtaining the second key $K_{eNB2}$; $K_{ASME2}$, deriving the joint key $K_{eNB\_joint}$; $K_{ASME\_joint}$ based on the first joint key and the second key $K_{eNB2}$; $K_{ASME2}$.

In various embodiments, the joint key $K_{eNB\_joint}$; $K_{ASME\_joint}$ is used for determining cryptographic keys for protecting communication with the network node 11; 12 for at least one of the at least two network instances.

In a first variation of the above embodiment, the determining comprises deriving, based on the joint key $K_{eNB\_joint}$, the cryptographic keys, wherein the cryptographic keys are used for one or more of: access stratum integrity key $K_{RRC\_int}$ for integrity protection of radio resource control traffic, access stratum encryption key $K_{RRC\_enc}$ for encryption of radio resource control traffic, access stratum encryption key $K_{UP\_enc}$ for encryption of user plane traffic, and access stratum integrity key $K_{UP\_int}$ for integrity protection user plane traffic.

In a second variation of the above embodiment, the determining comprises deriving, based on the joint key $K_{ASME\_joint}$, the cryptographic keys, wherein the cryptographic keys are used for one or more of: non-access stratum integrity key $K_{NAS\_int}$ for integrity protection of non-access stratum traffic, and non-access stratum encryption key $K_{NAS\_enc}$ for encryption of non-access stratum traffic.

From the above two embodiments it is clear that the method 40 may be used for protecting AS communication and/or NAS communication.

In various embodiments, the network node 11 comprises a network node of a radio access network 13 and wherein the joint key $K_{eNB\_joint}$ is used for protecting access stratum communication with the network node 11.

In various embodiments, the network node 12 comprises a network node of a core network 15 and wherein the joint key $K_{ASME\_joint}$ is used for protecting non-access stratum communication with the network node 12.

In an embodiment, the method 40 comprises receiving, from the network node 11; 12 and indication that a joint key $K_{eNB\_joint}$; $K_{ASME\_joint}$ is to be used. As described earlier, the communication device 14 should be made aware that a joint key is to be used, and this could, for instance, be made in signaling in a system information block, or as a pre-configuration in the communication device (e.g. that joint key is to be used when network slicing is utilized).

In various embodiments, the obtaining the first key $K_{eNB1}$; $K_{ASME1}$ and the second key $K_{eNB2}$; $K_{ASME2}$ comprises deriving the respective key based on a respective secret shared between the communication device 14 and a second network node 17, 17a, 17b.

Figure 11:
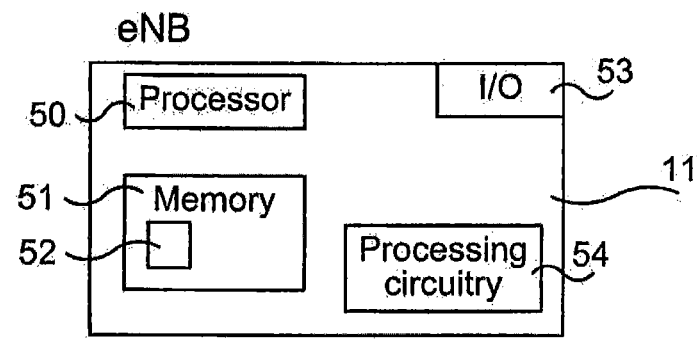
FIG. 11 illustrates schematically a system with network nodes and a communication device comprising means for implementing embodiments of methods in accordance with the present teachings.
Figure 11:
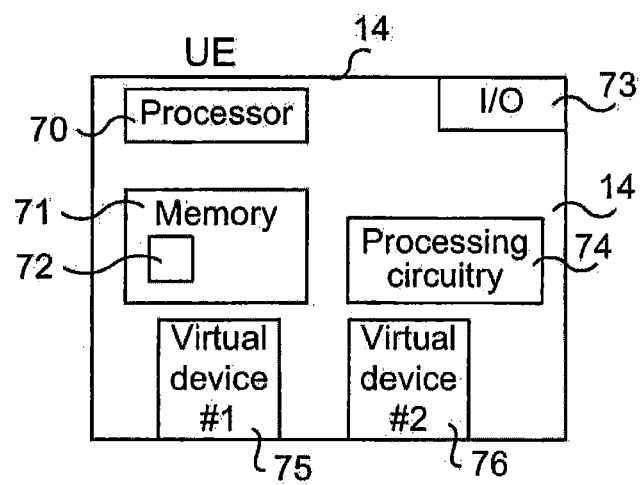
Figure 11:
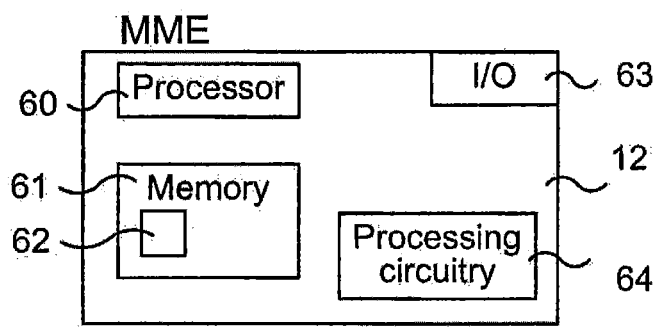

FIG. 11 illustrates schematically a communications system 10 and means for implementing embodiments in accordance with the present teachings. In FIG. 11, the communications system 10 is shown comprising a communication device 14 (UE), a radio access node (eNB) and a core network node 12 (MME), in which methods according to the present teachings may be implemented.

The radio access node 11, the core network node 12 and the communication device 14, each comprises a processor 50, 60, 70 comprising any combination of one or more of a central processing unit (CPU), multiprocessor, microcontroller, digital signal processor (DSP), application specific integrated circuit etc. capable of executing software instructions stored in a respective memory 51, 61, 71 which can thus be a computer program product 51, 61, 71. The processor 50 of the radio access node 11 and the processor 60 of the core network node 12 can be configured to execute any of the various embodiments of the method 30 for instance as described in relation to FIG. 9. The processor 70 of the communication device 14 can be configured to execute any of the various embodiments of the method 40 for instance as described in relation to FIG. 10.

The respective memory 51, 61, 71 can be any combination of read and write memory (RAM) and read only memory (ROM), Flash memory, magnetic tape, Compact Disc (CD)-ROM, digital versatile disc (DVD), Blu-ray disc etc. The memory 51, 61, 71 may also comprise persistent storage, which, for example, can be any single one or combination of magnetic memory, optical memory, solid state memory or even remotely mounted memory.

Each of the radio access node 11, the core network node 12 and the communication device 14 comprises a respective interface 53, 63, 73 for communication with other devices. The interfaces 53, 63, 73 may, for instance, comprise e.g. protocol stacks etc., for communication with other devices.

Each of the radio access node 11, the core network node 12 and the communication device 14 may comprise additional processing circuitry, schematically indicated at reference numerals 54, 64, 74, respectively, for implementing the various embodiments according to the present teachings.

A network node 11, 12 for establishing a key related to at least two network instances Slice 1, Slice 2 is provided. The network instances Slice 1, Slice 2 are used in serving a communication device 14. The network node 11; 12 is configured to:

obtain a first key $K_{eNB1}$; $K_{ASME1}$ relating to at least a first network instance Slice 1, obtain a second key $K_{eNB2}$; $K_{ASME2}$ relating to an additional network instance Slice 2, and determine, based on the first key $K_{eNB1}$; $K_{ASME1}$ and the second key $K_{eNB2}$; $K_{ASME2}$, a joint key $K_{eNB\_joint}$; $K_{ASME\_joint}$ for use in protecting communication with the communication device 14 on the at least first network instance Slice 1 and on the additional network instance Slice 2.

The network node 11, 12 may be configured to perform the above steps e.g. by comprising one or more processors 50, 60 and memory 51, 61, the memory 51, 61 containing instructions executable by the processor 50, 60, whereby the network node 11, 12 is operative to perform the steps.

In an embodiment, the network node 11; 12 is configured to determine the joint key $K_{eNB\_joint}$; $K_{ASME\_joint}$ by deriving a first joint key based on the first key $K_{eNB1}$; $K_{ASME1}$ and configured to, upon obtaining the second key $K_{eNB2}$; $K_{ASME2}$, derive the joint key $K_{eNB\_joint}$; $K_{ASME\_joint}$ based on the first joint key and the second key $K_{eNB2}$; $K_{ASME2}$.

In an embodiment, the joint key $K_{eNB\_joint}$; $K_{ASME\_joint}$ is used for determining cryptographic keys for protecting communication with the communication device 14 for at least one of the at least two network instances.

In a first variation of the above embodiment, the network node 11; 12 is configured to determine by deriving, based on the joint key $K_{eNB\_joint}$, the cryptographic keys, wherein the cryptographic keys are used for one or more of: access stratum integrity key $K_{RRC\_int}$ for integrity protection of radio resource control traffic, access stratum encryption key $K_{RRC\_enc}$ for encryption of radio resource control traffic, access stratum encryption key $K_{UP\_enc}$ for encryption of user plane traffic, and access stratum integrity key $K_{UP\_int}$ for integrity protection user plane traffic.

In a second variation of the above embodiment, the network node 11; 12 is configured to determine by deriving, based on the joint key $K_{ASME\_joint}$, the cryptographic keys, wherein the cryptographic keys are used for one or more of:

non-access stratum integrity key $K_{NAS\_int}$ for integrity protection of non-access stratum traffic, and non-access stratum encryption key $K_{NAS\_enc}$ for encryption of non-access stratum traffic.

It is noted that the above two embodiments may be combined, so that AS communication as well as NAS communication are protected by use of a respective joint key.

In various embodiments, the network node n comprises a network node, e.g. an eNB, of a radio access network 13. In such embodiments, the network node 11 may be configured to use the joint key $K_{eNB\_joint}$ in the protection of access stratum communication with the communication device 14.

In various other embodiments, the network node 12 comprises a network node, e.g. an MME, of a core network 15. In such embodiments, the network node 12 may be configured to use the joint key $K_{ASME\_joint}$ in the protection of non-access stratum communication with the communication device 14.

In various embodiments, the network node 11; 12 is configured to indicate, to the communication device 14, that a joint key $K_{eNB\_joint}$; $K_{ASME\_joint}$ is to be used.

In various embodiments, the network node 11 is configured to obtain the first key $K_{eNB1}$; $K_{ASME1}$ relating to at least the first network instance Slice 1 and to obtain the second key $K_{eNB2}$; $K_{ASME2}$ relating to an additional network instance Slice 2, by receiving the first key $K_{eNB1}$; $K_{ASME1}$ and the second key $K_{eNB2}$; $K_{ASME2}$ from a second network node 12; 17.

In various embodiments, the network node 11 is configured to establish a mode change of an active network instance, and configured to continue using the current joint key $K_{eNB\_joint}$; $K_{ASME\_joint}$ in protecting communication with the communication device 14 on the remaining active network instances.

The present teachings also encompass a computer program 52, 62 for a network node 11, 12 for establishing a key related to at least two network instances provided for a communication device 14. The computer program 52, 62 comprises computer program code, which, when executed on at least one processor on the network node 11, 12 causes the network node 11, 12 to perform the method 30 according to any of the described embodiments.

The present teachings also encompasses computer program products, such as memory 51, 61, comprising a computer program 52, 62 for implementing the embodiments of the method as described, and a computer readable means on which the computer program 52, 62 is stored. The computer program product, or the memory, thus comprises instructions executable by the processor 50, 60. Such instructions may be comprised in a computer program, or in one or more software modules or function modules. The computer program product 51, 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

A communication device 14 for establishing a key related to at least two network instances Slice 1, Slice 2 is provided. The network instances Slice 1, Slice 2) used in serving communication device 14. The communication device 14 is configured to:

obtain a first key $K_{eNB1}$; $K_{ASME1}$ relating to at least a first network instance Slice 1, obtain a second key $K_{eNB2}$; $K_{ASME2}$ relating to an additional network instance Slice 2, and determine, based on the first key $K_{eNB1}$; $K_{ASME1}$ and the second key $K_{eNB2}$; $K_{ASME2}$, a joint key $K_{eNB\_joint}$; $K_{ASME\_joint}$ for use in protecting communication with a network node 11; 12 on the at least first network instance and on the additional network instance Slice 1, Slice 2.

The communication device 14 may be configured to perform the above steps e.g. by comprising one or more processors 70 and memory 71, the memory 71 containing instructions executable by the processor 70, whereby the communication device 14 is operative to perform the steps.

In an embodiment, the communication device 14 is configured to determine by deriving a first joint key based on the first key $K_{eNB1}$; $K_{ASME1}$ and configured to, upon obtaining the second key $K_{eNB2}$; $K_{ASME2}$, derive the joint key $K_{eNB\_joint}$; $K_{ASME\_joint}$ based on the first joint key and the second key $K_{eNB2}$; $K_{ASME2}$.

In an embodiment, the communication device 14 is configured to use the joint key $K_{eNB\_joint}$; $K_{ASME\_joint}$ for determining cryptographic keys for protecting communication with the network node 11; 12 for at least one of the at least two network instances.

In an embodiment, the communication device 14 is configured to determine the cryptographic keys based on the joint key $K_{eNB\_joint}$, wherein the cryptographic keys are used for one or more of: access stratum integrity key $K_{RRC\_int}$ for integrity protection of radio resource control traffic, access stratum encryption key $K_{RRC\_enc}$ for encryption of radio resource control traffic, access stratum encryption key $K_{UP\_enc}$ for encryption of user plane traffic, and access stratum integrity key $K_{UP\_int}$ for integrity protection user plane traffic.

In an embodiment, the communication device 14 is configured to determine the cryptographic keys based on the joint key $K_{ASME\_joint}$, wherein the cryptographic keys are used for one or more of: non-access stratum integrity key $K_{NAS\_int}$ for integrity protection of non-access stratum traffic, and non-access stratum encryption key $K_{NAS\_enc}$ for encryption of non-access stratum traffic.

In various embodiments, the network node 11 comprises a network node of a radio access network 13 and wherein the joint key $K_{eNB\_joint}$ is used for protecting access stratum communication with the network node 11.

In various other embodiments, the network node 12 comprises a network node of a core network 15 and wherein the joint key $K_{ASME\_joint}$ is used for protecting non-access stratum communication with the network node 12.

In view of the above two embodiments, it is noted that the communication device 14 may be configured to use a joint key according to the method 40 for AS communication, for NAS communication or for both AS and NAS communication.

In an embodiment, the communication device 14 is configured to receive, from the network node 11; 12 and indication that a joint key $K_{eNB\_joint}$; $K_{ASME\_joint}$ is to be used.

In an embodiment, the communication device 14 is configured to obtain the first key $K_{eNB1}$; $K_{ASME1}$ and the second key $K_{eNB2}$; $K_{ASME2}$ by deriving the respective key based on a respective secret shared between the communication device 14 and a second network node 17, 17a, 17b.

The present teachings also encompass a computer program 72 for a communication device 14 for establishing a key related to at least two network instances Slice 1, Slice 2. The computer program 72 comprises computer program code, which, when executed on at least one processor on the communication device 14 causes the communication device 14 to perform the method 40 according to any of the described embodiments.

The present teachings also encompasses computer program products, such as memory 71 comprising a computer program 72 for implementing the embodiments of the method as described, and a computer readable means on which the computer program 72 is stored. The computer program product, or the memory, thus comprises instructions executable by the processor 70. Such instructions may be comprised in a computer program, or in one or more software modules or function modules. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 12:
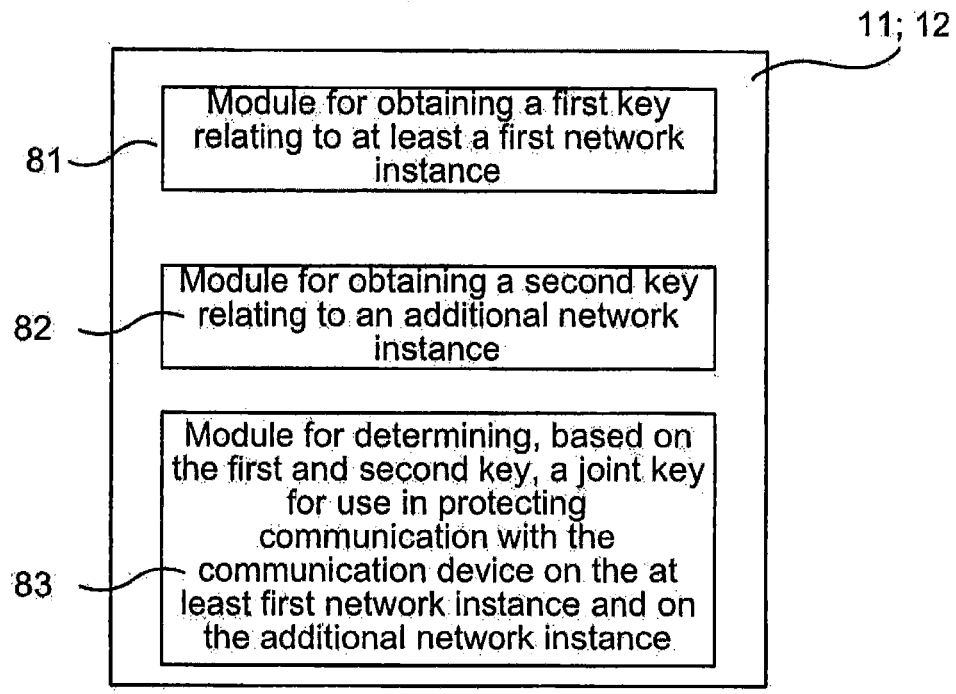
FIG. 12 illustrates a network node comprising function modules/software modules for implementing methods in accordance with the present teachings.

FIG. 12 illustrates a network node 11, 12 comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described.

A network node 11, 12 is provided for establishing a key related to at least two network instances, the network instances used in serving a communication device 14.

The network node 11, 12 comprises a first module 81 for obtaining a first key relating to a first network instance. Such first module 81 may, for instance, comprise receiving circuitry (e.g. interface 53, 63 described with reference to FIG. 11).

The network node 11, 12 comprises a second module 82 for obtaining a second key relating to a second network instance. Such second module 82 may, for instance, comprise receiving circuitry (e.g. interface 53, 63 described with reference to FIG. 11).

The network node 11, 12 comprises a third module 83 for determining, based on the first key and the second key, a joint key for use in establishing communication with the communication device on the first network instance and on the second network instance. Such third module 83 may, for instance, comprise processing circuitry adapted to perform such determining (e.g. processing circuitry 54, 64 described with reference to FIG. 11). The processing circuitry may, for instance, be adapted to perform the determining by implementing a key derivation function.

It is noted that one or more of the modules 81, 82, 83 may be replaced by units.

Figure 13:
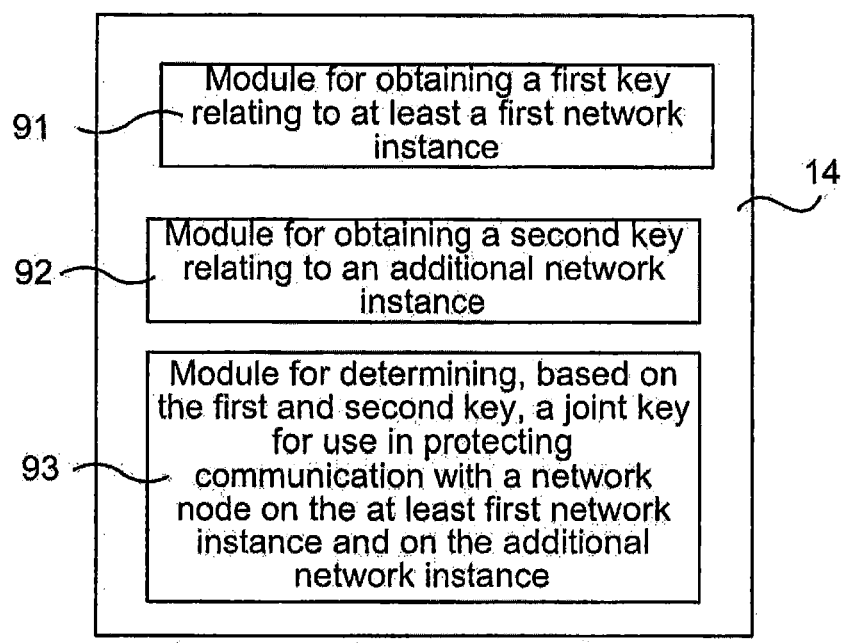
FIG. 13 illustrates a communication device comprising function modules/software modules for implementing methods in accordance with the present teachings.

FIG. 13 illustrates a communication device 14 comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described.

A communication device 14 of establishing a key related to at least two network instances is provided, wherein the network instances are used in serving communication device 14.

The communication device 14 comprises a first module 91 for obtaining a first key relating to a first network instance. Such first module 91 may, for instance, comprise processing circuitry adapted for deriving the first key based on a secret shared between the communication device 14 and a second network node (e.g. processing circuitry 74 described with reference to FIG. 11).

The communication device 14 comprises a second module 92 for obtaining a second key relating to an additional network instance. Such second module 92 may, for instance, comprise processing circuitry adapted for deriving the second key based on a secret shared between the communication device 14 and a second network node (e.g. processing circuitry 74 described with reference to FIG. 11).

The communication device 14 comprises a third module 93 for determining, based on the first key and the second key, a joint key for use in protecting communication with a network node on the at least first network instance and on the additional network instance. Such third module 93 may, for instance, comprise processing circuitry adapted to perform such determining (e.g. processing circuitry 74 described with reference to FIG. 11). The processing circuitry may, for instance, be adapted to perform the determining by implementing a key derivation function.

It is noted that one or more of the modules 91, 92, 93 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed by a network node of a wireless communication network to derive a joint key to encrypt a first network instance of a first network slice of the wireless communication network and a second network instance of a second network slice of the wireless communication network, each of the first and second network instances serving a wireless communication device operating in the wireless communication network, the method comprising:
    establishing the first network instance of the first network slice with the wireless communication device;
    responsive to establishing the first network instance, deriving a first key to encrypt communications exchanged between the wireless communication device and the network node in the first network instance;
    establishing the second network instance of the second network slice with the wireless communication device;
    responsive to establishing the second network instance, deriving a second key to encrypt communications exchanged between the wireless communication device and the network node in the second network instance;
    responsive to deriving the second key, deriving, based on the first key and the second key, the joint key to encrypt communications exchanged between the network node and the wireless communication device in the first network instance and in the second network instance; and
    encrypting communications exchanged between the network node and the wireless communication device in the first network instance and the second network instance using cryptographic keys derived from the joint key, wherein the first network instance comprises first access stratum and first non-access stratum communications exchanged respectively in an access stratum protocol layer and a non-access stratum protocol layer of the wireless communication network; and wherein the second network instance comprises second access stratum and second non-access stratum communications exchanged respectively in the access stratum protocol and the non-access stratum protocol layer of the wireless communication network.

2. The method as claimed in claim 1, wherein the determining cryptographic keys comprises deriving, based on the joint key, the cryptographic keys, wherein the cryptographic keys are used for one or more of: access stratum integrity key for integrity protection of radio resource control traffic in the first and second network instances, access stratum encryption key for encryption of radio resource control traffic in the first and second network instances, access stratum encryption key for encryption of user plane traffic in the first and second network instances, and access stratum integrity key for integrity protection user plane traffic in the first and second network instances.

3. The method as claimed in claim 1, wherein the determining cryptographic keys comprises deriving, based on the joint key, the cryptographic keys, wherein the cryptographic keys are used for one or more of: non-access stratum integrity key for integrity protection of non-access stratum traffic in the first and second network instances, and non-access stratum encryption key for encryption of non-access stratum traffic in the first and second network instances.

4. The method as claimed in claim 1, wherein the network node comprises a network node of a radio access network.

5. The method as claimed in claim 4, wherein encrypting the communications exchanged in the first and second instances comprises encrypting access stratum communications exchanged with the wireless communication device based on the joint key.

6. The method as claimed in claim 1, wherein the network node comprises a network node of a core network.

7. The method as claimed in claim 6, wherein encrypting the communications exchanged in the first and second instances comprises encrypting non-access stratum communications exchanged with the wireless communication device based on the joint key.

8. The method as claimed in claim 1, comprising indicating, to the wireless communication device, to encrypt communications exchanged in the first and second instances based on the joint key.

9. The method as claimed in claim 1, wherein the deriving the first key to encrypt communications exchanged in the first network instance comprises receiving the first key from a second network node of the wireless communication network; and wherein the deriving a second key to encrypt communications exchanged in the second network instance comprises receiving the second key from the second network node.

10. The method as claimed in claim 1, further comprising:

detecting a mode change of one of the first and second network instances from an active network instance to an inactive network instance; and continuing encrypting communications exchanged with the wireless communication device in a remaining active network instance of the first and second network instances based on the joint key.

11. The method of claim 1, wherein the first network slice comprises a mobile broadband type communication slice of the wireless communication network and the second network slice comprises a machine type communication slice of the wireless communication network.

12. The method of claim 1, wherein the first network slice is operated by a first operator of the wireless communication network and the second network slice is operated by a second operator of the wireless communication network.

13. The method of claim 1, wherein the first network instance and the second network instance each comprise an Evolved Packet Core (EPC) instance of the wireless communication network.

14. A network node of a wireless communication network to derive a joint key to encrypt a first network instance of a first network slice of the wireless communication network and a second network instance of a second network slice of the wireless communication network, each of the first and second network instances serving a wireless communication device operating in the wireless communication network, the network node comprising:

a hardware processor configured to:

establish the first network instance of the first network slice with the wireless communication device;

responsive to the establishment of the first network instance, derive a first key to encrypt communications exchanged between the wireless communication device and the network node in the first network instance;

establish the second network instance of the second network slice with the wireless communication device;

responsive to the establishment of the second network instance, derive a second key to encrypt communications exchanged between the wireless communication device and the network node in the second network instance;

responsive to deriving the second key, derive, based on the first key and the second key, the joint key to encrypt communications exchanged between the network node and the wireless communication device in the first network instance and in the second network instance; and encrypt communications exchanged between the network node and the wireless communication device in the first network instance and the second network instance using cryptographic keys derived from the joint key, wherein the first network instance comprises first access stratum and first non-access stratum communications exchanged respectively in an access stratum protocol layer and a non-access stratum protocol layer of the wireless communication network; and wherein the second network instance comprises second access stratum and second non-access stratum communications exchanged respectively in the access stratum protocol and the non-access stratum protocol layer of the wireless communication network.

15. The network node as claimed in claim 14, wherein the hardware processor is further configured to determine the cryptographic keys by deriving, based on the joint key, the cryptographic keys, wherein the cryptographic keys are used for one or more of: access stratum integrity key for integrity protection of radio resource control traffic in the first and second network instances, access stratum encryption key for encryption of radio resource control traffic in the first and second network instances, access stratum encryption key for encryption of user plane traffic in the first and second network instances, and access stratum integrity key for integrity protection user plane traffic in the first and second network instances.

16. The network node as claimed in claim 14, wherein the hardware processor is further configured to determine the cryptographic keys by deriving, based on the joint key, the cryptographic keys, wherein the cryptographic keys are used for one or more of: non-access stratum integrity key for integrity protection of non-access stratum traffic in the first and second network instances, and non-access stratum encryption key for encryption of non-access stratum traffic in the first and second network instances.

17. The network node as claimed in claim 14, wherein the network node comprises a network node of a radio access network.

18. The network node as claimed in claim 17, wherein the hardware processor is further configured to encrypt access stratum communications exchanged with the wireless communication device based on the joint key.

19. The network node as claimed in claim 14, wherein the network node comprises a network node of a core network.

20. The network node as claimed in claim 19, wherein the hardware processor is further configured to encrypt non-access stratum communications exchanged with the wireless communication device based on the joint key.

21. The network node as claimed in claim 14, wherein the hardware processor is further configured to indicate, to the wireless communication device, to encrypt communications exchanged in the first and second instances based on the joint key.

22. The network node as claimed in claim 14, wherein the hardware processor is further configured to:
derive the first key to encrypt communications exchanged between the wireless communication device and the network node in the first network instance by receiving the first key from a second network node of the wireless communication network; and
derive the second key to encrypt communications exchanged in the second network instance, by receiving the second key from the second network node.

23. The network node as claimed in claim 14, wherein the hardware processor is further configured to:
detect a mode change of one of the first and second network instances from an active network instance to an inactive network instance; and
continue to encrypt communications exchanged with the wireless communication device in a remaining active network instance of the first and second network instances based on the joint key.

24. A method performed by a wireless communication device operating in a wireless communication network to derive a joint key to encrypt a first network instance of a first network slice of the wireless communication network and a second network instance of a second network slice of the wireless communication network, each of the first and second network instances serving the wireless communication device, the method comprising:
establishing the first network instance of the first network slice with a network node of the wireless communication network;
responsive to establishing the first network instance, deriving a first key to encrypt communications exchanged between the wireless communications device and the network node in the first network instance;
establishing the second network instance of the second network slice with the network node of the wireless communication network;
responsive to establishing the second network instance, deriving a second key to encrypt communications exchanged between the wireless communications device and the network node in the second network instance;
responsive to deriving the second key, deriving, based on the first key and the second key, the joint key to encrypt communications exchanged between the wireless communication device and the network node in the first network instance and in the second network instance; and
encrypting communications exchanged between the wireless communication device and the network node in the first network instance and the second network instance cryptographic keys derived from the joint key,
wherein the first network instance comprises first access stratum and first non-access stratum communications exchanged respectively in an access stratum protocol layer and a non-access stratum protocol layer of the wireless communication network; and
wherein the second network instance comprises second access stratum and second non-access stratum communications exchanged respectively in the access stratum protocol and the non-access stratum protocol layer of the wireless communication network.

25. The method as claimed in claim 24, wherein the determining cryptographic keys comprises deriving, based on the joint key, the cryptographic keys, wherein the cryptographic keys are used for one or more of: access stratum integrity key for integrity protection of radio resource control traffic in the first and second network instances, access stratum encryption key for encryption of radio resource control traffic in the first and second network instances, access stratum encryption key for encryption of user plane traffic in the first and second network instances, and access stratum integrity key for integrity protection user plane traffic in the first and second network instances.

26. The method as claimed in claim 24, wherein the determining cryptographic keys comprises deriving, based on the joint key, the cryptographic keys, wherein the cryptographic keys are used for one or more of: non-access stratum integrity key for integrity protection of non-access stratum traffic in the first and second network instances, and non-access stratum encryption key for encryption of non-access stratum traffic in the first and second network instances.

27. The method as claimed in claim 24, wherein the network node comprises a network node of a radio access network; and
wherein encrypting the communications exchanged in the first and second instances comprises encrypting access stratum communications with the network node based on the joint key.

28. The method as claimed in claim 24, wherein the network node comprises a network node of a core network; and
wherein encrypting the communications exchanged in the first and second instances comprises encrypting non-access stratum communications with the network node based on the joint key.

29. The method as claimed in claim 24, further comprising receiving, from the network node, an indication to encrypt communications exchanged in the first and second instances based on the joint key.

30. The method as claimed in claim 24, wherein the deriving the first key and the second key comprises deriving the respective key based on a respective secret shared between the wireless communication device and a second network node of the wireless communication network.

31. The method of claim 24, wherein the wireless communication device comprises a user equipment of an Evolved Packet wireless communication system (EPS).

32. The method of claim 24, wherein the wireless communication device comprises a machine type device of an Evolved Packet wireless communication system (EPS).

33. A wireless communication device for deriving a joint key to encrypt a first network instance of a first network slice of the wireless communication network and a second network instance of a second network slice of the wireless communication network, each of the first and second network instances serving the wireless communication device, the communication device being configured to:
    establish the first network instance of the first network slice with a network node of the wireless communication network;
    responsive to the establishment of the first network instance, derive a first key to encrypt communications exchanged between the wireless communications device and the network node in the first network instance;
    establish the second network instance of the second network slice with the network node of the wireless communication network;
    responsive to the establishment of the second network instance, derive a second key to encrypt communications exchanged between the wireless communications device and the network node in the second network instance;
    responsive to deriving the second key, determine, based on the first key and the second key, the joint key to encrypt communications exchanged between the wireless communication device and the network node in the first network instance and in the second network instance; and
    encrypt communications exchanged between the wireless communication device and the network node in the first network instance and the second network instance cryptographic keys derived from the joint key,
    wherein the first network instance comprises first access stratum and first non-access stratum communications exchanged respectively in an access stratum protocol layer and a non-access stratum protocol layer of the wireless communication network; and
    wherein the second network instance comprises second access stratum and second non-access stratum communications exchanged respectively in the access stratum protocol and the non-access stratum protocol layer of the wireless communication network.

34. The wireless communication device as claimed in claim 33, further configured to derive the cryptographic keys based on the joint key, wherein the cryptographic keys are used for one or more of: access stratum integrity key for integrity protection of radio resource control traffic in the first and second network instances, access stratum encryption key for encryption of radio resource control traffic in the first and second network instances, access stratum encryption key for encryption of user plane traffic in the first and second network instances, and access stratum integrity key for integrity protection user plane traffic in the first and second network instances.

35. The wireless communication device as claimed in claim 33, further configured to derive the cryptographic keys based on the joint key, wherein the cryptographic keys are used for one or more of: non-access stratum integrity key for integrity protection of non-access stratum traffic in the first and second network instances, and non-access stratum encryption key for encryption of non-access stratum traffic in the first and second network instances.

36. The wireless communication device as claimed in claim 33, wherein the network node comprises a network node of a radio access network; and
    wherein the wireless communication device is further configured to encrypt the communications exchanged in the first and second instances by encrypting access stratum communications with the network node based on the joint key.

37. The wireless communication device as claimed in claim 33, wherein the network node comprises a network node of a core network; and
    wherein the wireless communication device is further configured to encrypt the communications exchanged in the first and second instances by encrypting non-access stratum communications with the network node based on the joint key.

38. The wireless communication device as claimed in claim 33, configured to receive, from the network node an indication to encrypt communications exchanged in the first and second instances based on the joint key.

39. The wireless communication device as claimed in claim 33, further configured to derive the first key and the second key by deriving the respective key based on a respective secret shared between the wireless communication device and a second network node of the wireless communication network.

* * * * *